US012033196B2

(12) United States Patent
Narayanam et al.

(10) Patent No.: US 12,033,196 B2
(45) Date of Patent: Jul. 9, 2024

(54) ACCELERATED INVOICING USING PREDICTIVE FREIGHT EVENTS

(71) Applicant: International Business Machines Corporation, Armonk, NY (US)

(72) Inventors: Krishnasuri Narayanam, Bangalore (IN); Pankaj Satyanarayan Dayama, Bangalore (IN); Yedendra Shrinivasan, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 17/480,173

(22) Filed: Sep. 21, 2021

(65) Prior Publication Data

US 2023/0096163 A1 Mar. 30, 2023

(51) Int. Cl.
| | |
|---|---|
| *G06Q 30/04* | (2012.01) |
| *G06F 16/27* | (2019.01) |
| *G06Q 10/0631* | (2023.01) |
| *G06N 20/00* | (2019.01) |
| *G06Q 10/083* | (2024.01) |
| *G06Q 10/0831* | (2023.01) |
| *G06Q 20/38* | (2012.01) |

(52) U.S. Cl.
CPC .......... *G06Q 30/04* (2013.01); *G06F 16/27* (2019.01); *G06Q 10/06315* (2013.01); *G06N 20/00* (2019.01); *G06Q 10/0831* (2013.01); *G06Q 10/0838* (2013.01); *G06Q 20/389* (2013.01)

(58) Field of Classification Search
CPC .......... G06Q 30/04; G06Q 10/06315; G06Q 10/0831; G06Q 10/0838; G06Q 20/389; G06Q 10/0832; G06F 16/27; G06N 20/00; G06N 3/044
See application file for complete search history.

(56) References Cited

U.S. PATENT DOCUMENTS

| | | | |
|---|---|---|---|
| 2004/0015392 A1 | 1/2004 | Hammel et al. | |
| 2015/0142545 A1 | 5/2015 | Ceribelli et al. | |
| 2018/0165758 A1 | 6/2018 | Saxena et al. | |
| 2018/0240066 A1* | 8/2018 | Streebin | G06Q 10/0832 |
| 2019/0114683 A1 | 4/2019 | Mundhra et al. | |
| 2020/0019923 A1* | 1/2020 | Santhar | G06Q 10/0832 |

(Continued)

FOREIGN PATENT DOCUMENTS

| | | |
|---|---|---|
| CN | 106920136 A | 7/2017 |
| CN | 111161046 A | 5/2020 |

OTHER PUBLICATIONS

Anonymoous, Factoring (Finance), Wikipdedia, https://en.wikipedia.org/wiki/Factoring_(finance).
Anonymous, 7 Major Documents required for import clearance under high sea sale, posted on Jan. 4, 2019, https://howtoexportimport.com/7-Major-Documents-required-for-import-clearance-un-391.aspx.

(Continued)

*Primary Examiner* — Charles Guiliano

(57) ABSTRACT

An example operation may include one or more of querying, via an application programming interface (API), a blockchain ledger for attributes of a shipment by a carrier from an origin location to a destination location, predicting, via an artificial intelligence (AI) model, one or more future events that will occur during the shipment based on the attributes of the shipment retrieved from querying the blockchain ledger, generating, via a smart contract, an accelerated e-invoice based on the one or more future events predicted by the AI model, and storing the accelerated e-invoice on the blockchain ledger.

20 Claims, 23 Drawing Sheets

(56) References Cited

U.S. PATENT DOCUMENTS

2020/0118086 A1* 4/2020 Achkir .................. H04L 63/105
2021/0319398 A1* 10/2021 Streebin ............. G06Q 10/0833

OTHER PUBLICATIONS

Anonymous, Deep Sea Freight Transportation Loans: Cargo Shipping Financing, GCG GUD Capital, https://gudcapital.com/deep-sea-freight-transportation-loans, last accessed on Sep. 18, 2021.

Anonymous, Invoices and payment processes in global container shipping: ready for disruption?, https://www.hellenicshippingnews.com/invoicing-and-payment-processes-in-global-container-shipping-ready-for-disruption/.

Anonymous, Smart cash management for importers & exporters, cogoport, https://www.cogoport.com/pay-later, last downloaded on Sep. 18, 2021.

Anonymous, Supply Chain Finance, Wikipedia, https://en.wikipedia.org/wiki/Reverse_factoring.

Anonymous, Unlock Your Growth Potential, flexport, https://www.flexport.com/services/trade-finance/, last downloaded on Sep. 18, 2021.

Bloomenthal, Supply Chain Finance, reviewed on May 31, 2021, Investopedia, https://www.investopedia.com/terms/s/supply-chain-finance.asp.

Narayanam et al., Blockchain Based e-Invoicing Platform for Global Trade, 2020 IEEE International Conference on Blockchain, Date of Conference: Nov. 2-6, 2020, Date added to IEEE Xplore: Dec. 14, 2020; Authorized licensed use limited to IBM, downloaded on Aug. 28, 2021, pp. 385-392.

Thakur, Reverse Factoring, WallStreetMojo, https://www.wallstreetmojo.com/reverse-factoring, accesseded on Sep. 18, 2021.

Narayanam et al., Accelerated carrier invoice factoring using predictive freight transport events, rXiv:2203.02799v1, Mar. 5, 2022.

\* cited by examiner

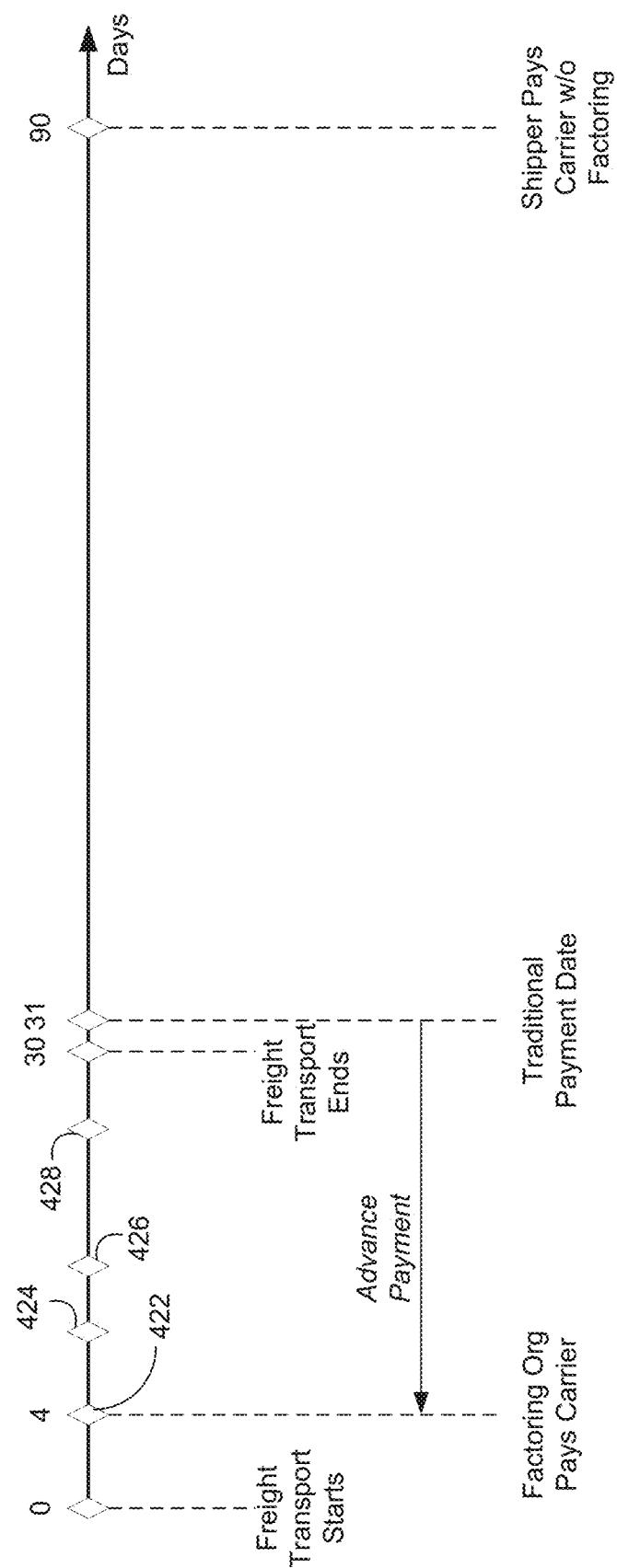

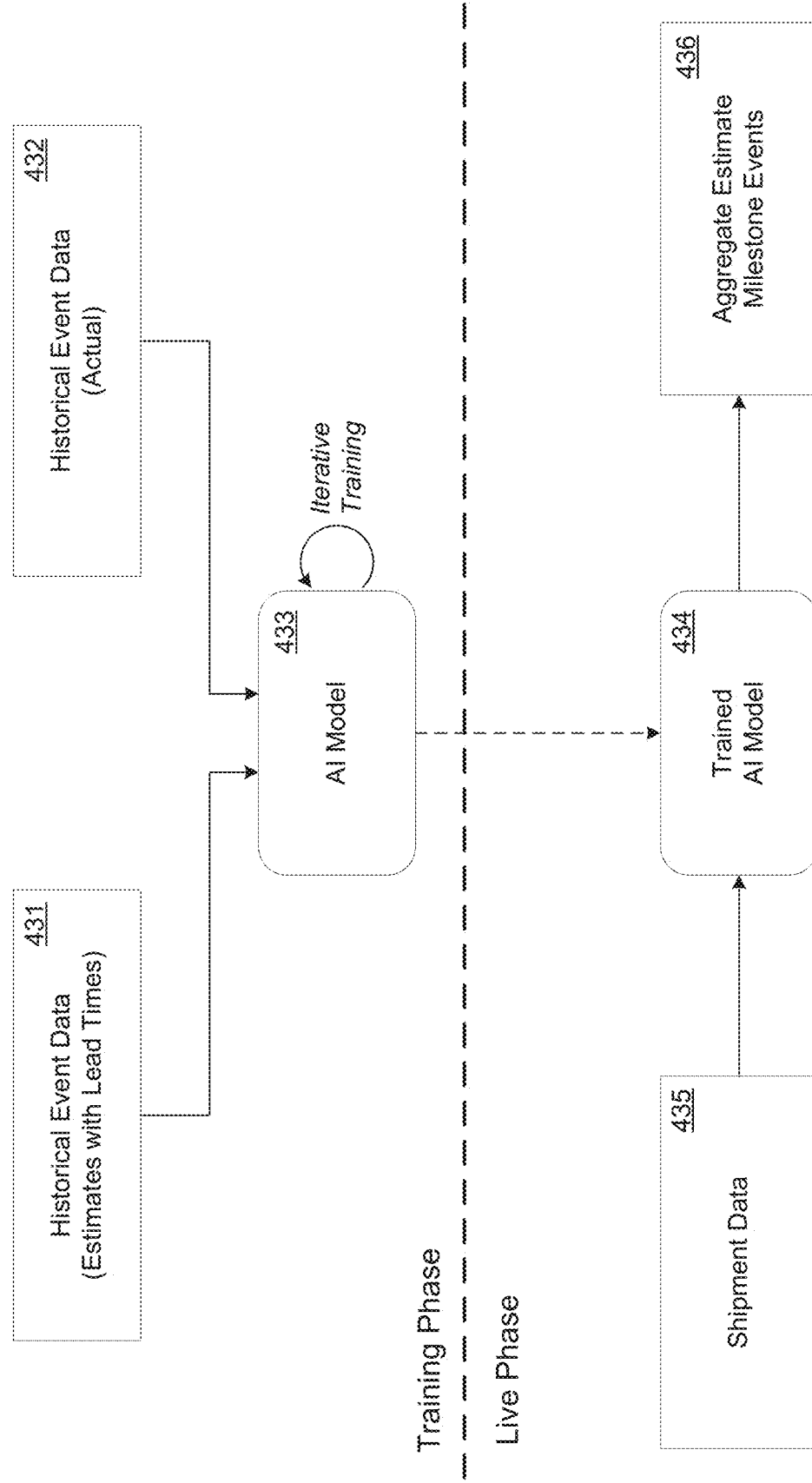

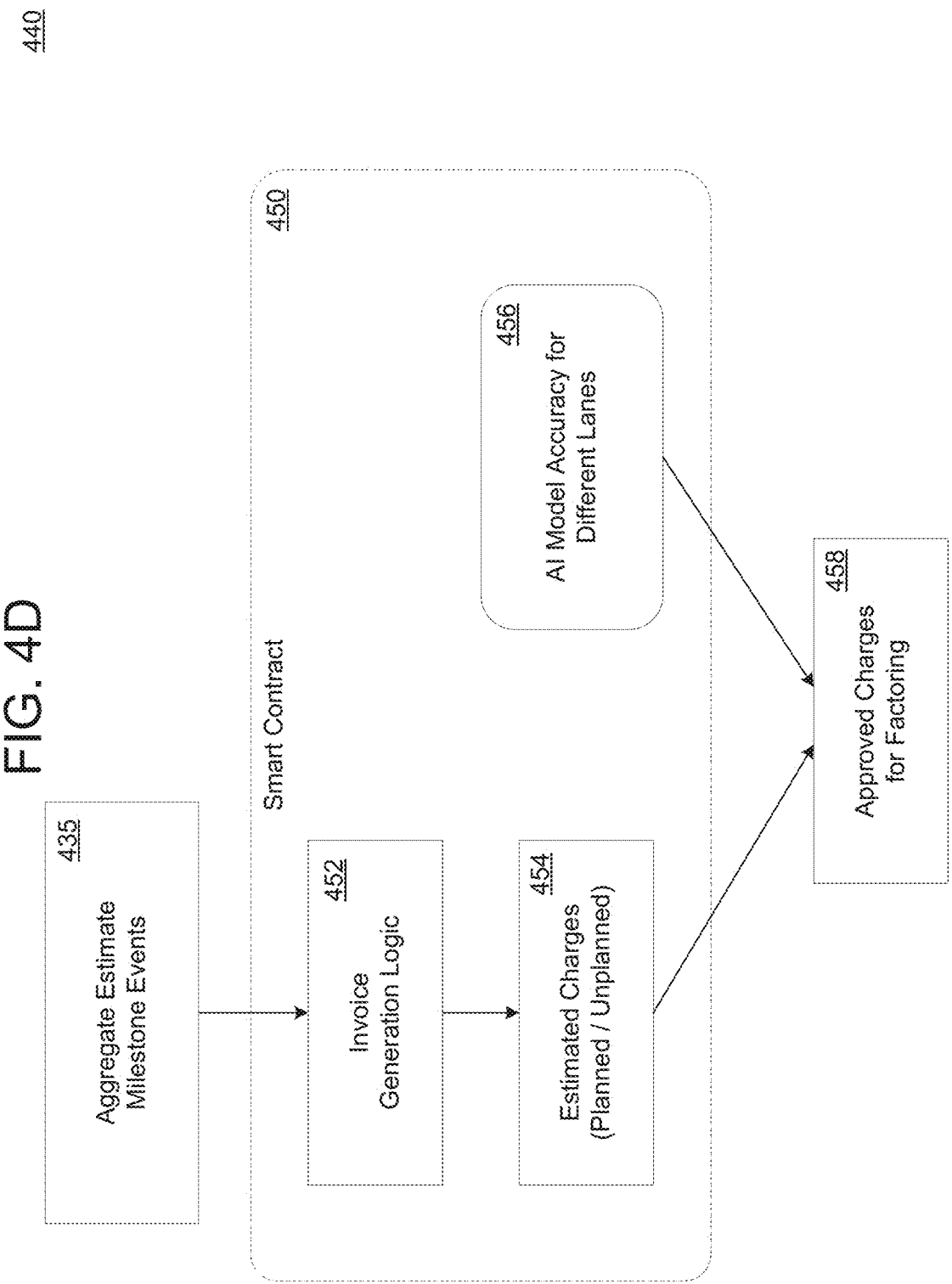

ACCELERATED INVOICING USING PREDICTIVE FREIGHT EVENTS

BACKGROUND

A centralized platform stores and maintains data in a single location. This location is often a central computer, for example, a cloud computing environment, a web server, a mainframe computer, or the like. Information stored on a centralized platform is typically accessible from multiple different points. Multiple users or client workstations can work simultaneously on the centralized platform, for example, based on a client/server configuration. A centralized platform is easy to manage, maintain, and control, especially for purposes of security because of its single location. Within a centralized platform, data redundancy is minimized as a single storing place of all data also implies that a given set of data only has one primary record.

SUMMARY

One example embodiment provides an apparatus that includes a memory storing a blockchain ledger, and a processor configured to one or more of query, via an application programming interface (API), the blockchain ledger for attributes of a shipment by a carrier from an origin location to a destination location, predict, via an artificial intelligence (AI) model, one or more future events that will occur during the shipment based on the attributes of the shipment retrieved from querying the blockchain ledger, generate, via a smart contract, an accelerated e-invoice based on the one or more future events predicted by the AI model, and store the accelerated e-invoice on the blockchain ledger.

Another example embodiment provides a method that includes one or more of querying, via an application programming interface (API), a blockchain ledger for attributes of a shipment by a carrier from an origin location to a destination location, predicting, via an artificial intelligence (AI) model, one or more future events that will occur during the shipment based on the attributes of the shipment retrieved from querying the blockchain ledger, generating, via a smart contract, an accelerated e-invoice based on the one or more future events predicted by the AI model, and storing the accelerated e-invoice on the blockchain ledger.

A further example embodiment provides a non-transitory computer-readable medium comprising instructions, that when read by a processor, cause the processor to perform one or more of querying, via an application programming interface (API), a blockchain ledger for attributes of a shipment by a carrier from an origin location to a destination location, predicting, via an artificial intelligence (AI) model, one or more future events that will occur during the shipment based on the attributes of the shipment retrieved from querying the blockchain ledger, generating, via a smart contract, an accelerated e-invoice based on the one or more future events predicted by the AI model, and storing the accelerated e-invoice on the blockchain ledger.

BRIEF DESCRIPTION OF THE DRAWINGS

FIG. 4B is a diagram illustrating a timeline of events of the accelerated e-invoicing process shown in FIG. 4A, according to example embodiments.

FIG. 4C is a diagram illustrating a lifecycle of an artificial intelligence (AI) model for generating accelerated e-invoices according to example embodiments.

FIG. 4D is a diagram illustrating a process of a smart contract of the blockchain-based e-invoicing platform according to example embodiments.

DETAILED DESCRIPTION

Figure 1A:
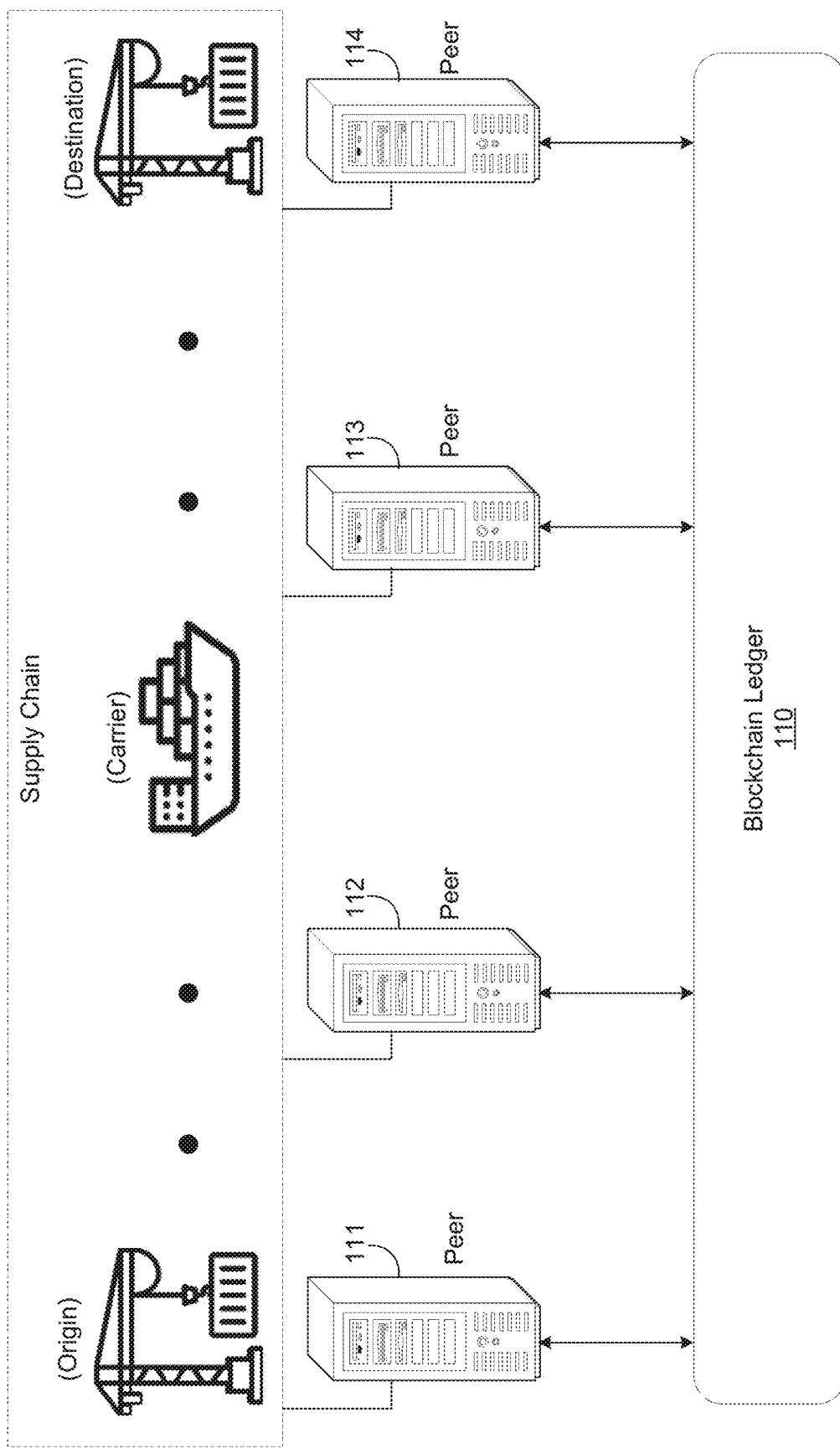
FIG. 1A is a diagram illustrating a blockchain network for generating and sharing real-time shipping data according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which are directed to an accelerated e-invoicing system of a blockchain network.

In one embodiment this application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

In the example embodiments, a supply chain platform is integrated with a blockchain network enabling shipments, such as cargo, freight, goods, and the like, to be tracked in-real time as they move from a point of origin (origin location) to a destination location. Participants of the supply chain platform, such as port authorities, shippers, carriers, suppliers, logistics providers, and the like, may be participants (i.e., be in control of or own blockchain peers) within the blockchain network. Different milestone events of the shipment may be captured by the supply chain platform participants and recorded/tracked on a blockchain ledger. For example, real-time shipment tracking of milestone events about the progress of freight in transportation from the origin to the destination may be captured and recorded on the blockchain.

According to various embodiments, accelerated e-invoices may be generated and paid to a carrier while the shipment being performed by the carrier is still in process. That is, rather than the carrier having to reach the destination with the shipment, the carrier can be paid in advance (e.g., a partial payment or a full payment) using an accelerated e-invoice that is generated based on predicted future events of the shipment (i.e., events that have not yet occurred but are predicted to occur or events that have occurred but for which charges have not yet been generated). In one embodiment, a carrier receives payment in "chunks" or portions as the carrier reaches its milestone event. For example, a shipment may have five milestone events. In this case, the carrier may receive five partial payments in response to the five milestone events, respectively. Each "chunk" or partial payment may be determined based on the milestone event, future/predicted charges, charges that have accrued since the last milestone event, and the like. The final partial payment may happen after the completion of the goods delivery and all the previous partial payments happen before the completion of the goods delivery. The final partial payment may be known as the settlement payment of the e-invoice by the factoring organization to the carrier.

For example, a shipment may take a carrier 30 days to complete. Here, the carrier may be paid shortly after the completed delivery of the shipment (e.g., the day of or the day after they bring the shipment into the destination port, etc.). Here, the carrier may present an invoice to a financial organization (referred to herein as a factoring organization). In response, the factoring organization may pay the carrier for the carrier-generated invoice. In contrast, in the example embodiments, an accelerated e-invoice is created by the blockchain platform based on predefined logic that is agreed to by the parties that participate in the supply chain and the blockchain network. The e-invoice may be "accelerated" and paid to the carrier (e.g., by the factoring organization) prior to delivery of the shipment to the destination. Furthermore, as the shipment continues to move from the source to the destination, the e-invoice can be updated and additional partial payments can be made by the factoring organization to the carrier. That is, the carrier may be paid for a portion of the shipment of goods/freight from a point of origin to a destination before the carrier and the cargo have reached said destination. The partial amount may correspond to services that are about to be rendered in the future or that have already been rendered but for which a cost is not yet known.

As an example, the factoring organization may pay the carrier a partial payment within a few days (e.g., 3 or 4 days) into a shipment that is expected to take significantly longer (e.g., 30 days, etc.) The AI model described herein may predict milestone events that are likely to occur. For example, the milestone events may be predicted based on a shipping lane that is predefined and mapped to the shipment. The milestone events can be used to identify portions of charges to be added to the accelerated e-invoice. In addition, the AI model (or multiple AI models) may be used to predict unexpected charges or unplanned charges to the shipment based on other factors such as demurrage, weather, and the like. In the example embodiments, the individual blockchain peers may host and execute AI models. Also, a peer in the blockchain network may be dedicated for AI models. As another example, an external source may host AI models and may be used/called by peers of the blockchain network.

In the example embodiments, milestone events may include both past events (i.e., events that have already occurred as part of the shipment) and future events that have not yet occurred but that are predicted to occur by an artificial intelligence (AI) model or models. As an example, events such as "container loaded on vessel", "vessel departure at origin", and the like, may be milestone events that have already occurred when the accelerated e-invoice is generated. Meanwhile, predicted future events of the shipment may include "estimated vessel arrival at destination", "estimated container discharge from vessel", and the like, but the future events are not limited thereto. The same milestone event might get reported by multiple parties involved in the supply chain which participate in the blockchain network. As an example, the event "container loaded on vessel" might get reported either by a carrier, by a port authority, by a supplier, and the like. Both in the case of past or future events, the reported time by different organizations may be different.

Both past events and future predicted events may be recorded on the blockchain ledger in the same format (i.e., the same amount and type of data fields). This allows the software to interact with both types of milestone events in the same way. For example, a query via an API can retrieve/return the same fields of data from the past events and predicted future events stored on the blockchain ledger thus making data acquisition efficient.

The example embodiments provide significant benefits over a traditional electronic invoicing system. In particular, rather than a carrier having to generate their own invoice, the blockchain platform can create an e-invoice based on progress of a shipment of goods that is captured (images, sensor readings, messages, etc.) and stored on the blockchain in an automated fashion and also predicted events that will likely occur using an AI model, and without the need for human intervention. The blockchain may include a smart contract with logic therein for generating the accelerated e-invoice such as one or more AI models, code for reading and writing milestone events to the blockchain ledger, and the like. The invoice may be updated as the shipment progresses on its journey from the source port to the destination port. For example, each milestone event that is detected may trigger an additional payment (e.g., a partial payment) from the factoring organization to the carrier.

In a traditional carrier payment scenario involving a factoring organization, a carrier receives payment (access to the payment) of an invoice amount within 1 or 2 days after goods delivery completion to the shipper. Here, the payment is made by the factoring organization on behalf of the shipper. There is usually a discount in the invoice amount which is the fee for the factoring organization (e.g., financial institution, bank, etc.) As an example, if the invoice amount is 100 USD, the carrier would receive the whole invoice amount 100 USD from the shipper typically after 60 days of completion of goods delivery. With invoice factoring in-place, the carrier would only receive a discounted invoice amount of 96 USD within 1 or 2 days after completion of goods delivery from bank. Meanwhile, the shipper can pay the factoring organization the whole invoice amount of 100USD within 60 days of completion of goods delivery. Thus, the factoring organization can advance payment to the carrier within a few days of delivery of the shipment. Observe that the bank paid only 96 USD to the carrier and got 100 USD after 60 days from the shipper in return.

The example embodiments speed-up the process in which a carrier gets paid even more than is done traditionally. In particular, the payment process may provide the carrier access to at least a partial invoice amount even before the goods delivery completion. In other words, rather than invoice settlement happening in one installment after the completion of the goods delivery, the invoice settlement can happen in multiple chunks/installments with one or more chunks paid to the carrier by the factoring organization before the completion of the goods delivery. For example, if the total invoice amount is 100 USD, the carrier may receive 65 USD from the factoring organization even before the completion of goods delivery to the destination. Furthermore, the remaining balance (minus any discount for the factoring organization) may be paid to the carrier within 1 or 2 days after completion of goods delivery to the shipper. In this example, the carrier may receive a final chunk/installment of 28 USD from the carrier after the shipment is completed. The shipper may pay to the factoring organization the whole invoice amount of 100 USD after 60 days of completion of goods delivery. So, the carrier would receive a total of only 93 USD (as against to 96 USD in the case of invoice factoring currently); and the benefit to the carrier is that it gets part of the discounted invoice amount even before the completion of the goods delivery. And the benefit to the factoring organization is that it only pays a total of 93 USD to the carrier and gets 100 USD after 60 days from the shipper in return. Observe that the shipper sees no difference with this process change. I.e., in both the cases, shipper would pay the whole invoice amount of 100 USD to the bank after 60 days of completion of goods delivery.

According to various aspects, the carrier gets paid at least a part of the discounted invoice amount before the completion of goods delivery. In some embodiments, the carrier gets paid this part of the invoice amount in chunks at different points in time, as the goods delivery progresses from the supplier/seller to the shipper/buyer. Continuing with the example above, of the 65 USD that the carrier received from the factoring organization before the goods delivery completion, 30 USD may have been paid first (e.g., upon detecting completion of a milestone "container loaded on vessel"), 20 USD may have been paid next (e.g., upon detecting completion of a milestone "actual vessel departure"), and 15 USD may have been paid in a third installment (e.g., upon detecting a milestone "actual vessel arrival").

The part of the discounted invoice amount that is paid by the factoring organization to the carrier may represent a subset of the planned charges and a subset of unplanned charges of the final carrier invoice. For example, a charge under any of these categories can be deterministic (i.e., is computable directly using rates), or non-deterministic (i.e., computable using rates, already happened shipping milestone events, and future shipping milestone events). For non-deterministic charges, the example embodiments may use an AI service to estimate the future milestone events required for the charge computation. Using the estimated milestone events, the predicted accuracy of these estimates, and the rates, the non-deterministic charges are computed by the AI service. At any given point in time during the container transportation from source to the destination, it may not be possible to compute all the charges going to be part of the final carrier invoice. And as the container transportation progresses and different milestone events continue to be met, more and more charges are computed.

One of the enablers of the example embodiments is the ability to generate an incremental carrier invoice (e-invoice) as the goods delivery progresses. For example, the system may compute the carrier invoice on blockchain whenever a milestone event is met (e.g., once after container is loaded on vessel, once after the departure of the vessel, once after the arrival of the vessel, etc.) When a new incremental carrier invoice is computed and it differs from the earlier version of the carrier invoice, then the factoring-organization/bank decides if a new chunk of invoice amount needs to be released to the carrier or not. The final chunk of the invoice amount is paid to the carrier by the factoring organization after the completion of the goods delivery. Furthermore, the factoring organization may reward the AI service provider. For example, this reward may be in proposition to the accuracy of the estimates of the future milestone events. Moreover, in an embodiment, the carrier might also reward the AI service provider for the services.

FIG. 1A illustrates a blockchain network 100 for generating and sharing real-time shipping data according to example embodiments. Referring to FIG. 1A, the blockchain network 100 includes a plurality of blockchain peers 111-114 which manage a shared and distributed blockchain ledger 110. In some embodiments, the blockchain ledger 110 may include a public blockchain, a permissioned blockchain, a state database (also referred to as a world state database), and the like. The blockchain network 100 may be composed of participants of a supply chain such as carriers, suppliers, ports of authority, logistics providers, government agencies, and the like. The participants may each manage their own computing systems (blockchain peers) that participate in the blockchain protocols described herein.

As freight is shipped from a point of origin to a destination location, the progress of the freight may be tracked and stored on the blockchain ledger 110. For example, milestone events may be tracked and recorded on the blockchain ledger 110 using the blockchain peers 111-114. Examples of the milestone events include, but are not limited to, "actual gate out," "actual gate in", "actual loaded on vessel", "actual vessel departure", "actual vessel arrival", "actual discharge from vessel", "actual gate out", "actual gate in", and the like. The format of a milestone event may be recorded on the blockchain as follows:

{
    "eventName": "Actual gate out",
    "transportationPhase": "Export",
    "fullStatus": "Empty",
    "eventType": "actualGateOut"
}

In addition to storing actual events, the blockchain peers 111-114 may include software with AI models therein for predicting future milestone events of a shipment. The future milestone events may be any of the "actual" events listed above. The blockchain peers 111-114 may use status information of the shipment, progress of the shipment, shipping lanes, external data, and the like, for predicting future milestone events. The predicted future events may be used to predict charges for an accelerated e-invoice. Examples of common charges that can be predicted and added to an accelerated e-invoice are listed below.

I. Land Carrier:
   a. Planned Charges: Charges like Fuel surcharge, packing charge, chassis utilization surcharge can be directly included in pre-carriage charge also sometime.
      i. Pre-carriage charge
      ii. Chassis utilization surcharge
      iii. Fuel surcharge
      iv. Packing charge
      v. Custom Clearance charge
      vi. Documentation charge
      vii. Base rate
   b. Unplanned Charges:
      i. Destination charge
      ii. Destination terminal charge II. Ocean Carrier:
   a. Planned Charges:
      i. Base rate
      ii. Destination Delivery Charge
      iii. Handling charge
      iv. Bunker adjustment charge
      v. Container Positioning charge
      vi. Hazardous surcharge
   b. Unplanned Charges:
      i. Detention charge
      ii. Demurrage charge
      iii. Repositioning charge The list of charges that can be added to an accelerated e-invoice may depend on the invoice type, for example, land carrier, ocean carrier, etc., and a service provider. Each service provider may charge different rates that can be agreed to in advance. The charges may be dynamic/changing. According to various embodiments, one or more of the blockchain peers 111-114 may execute an AI service with one or more AI models for predicting these charges. Some of the charges may change more frequently than others. Some of the charges may be easy to determine at the time of departure, but others (e.g., destination charges, demurrage, detention, repositioning, etc.) may require most if not all of the shipment to be performed, for example, due to price fluctuations, fuel used, unexpected issues at a destination, etc. Here, the AI models can be used to predict any of these different charges at any point in the shipment based on information about the shipment such as the origin, destination, carrier, etc. The AI models may initially be trained using historical data. The historical data may identify a point of origin, a destination, carriers, fees, etc. Over time, the AI models may be retrained based on the live predictions that are made by the AI models.

In some cases, the charges for different services may fluctuate often. Here, the predicted charges may not be identical to the exact charges, but the platform may resolve any differences between the accelerated e-invoice and the final e-invoice at delivery via a second transaction/payment on the blockchain ledger.

Figure 1B:
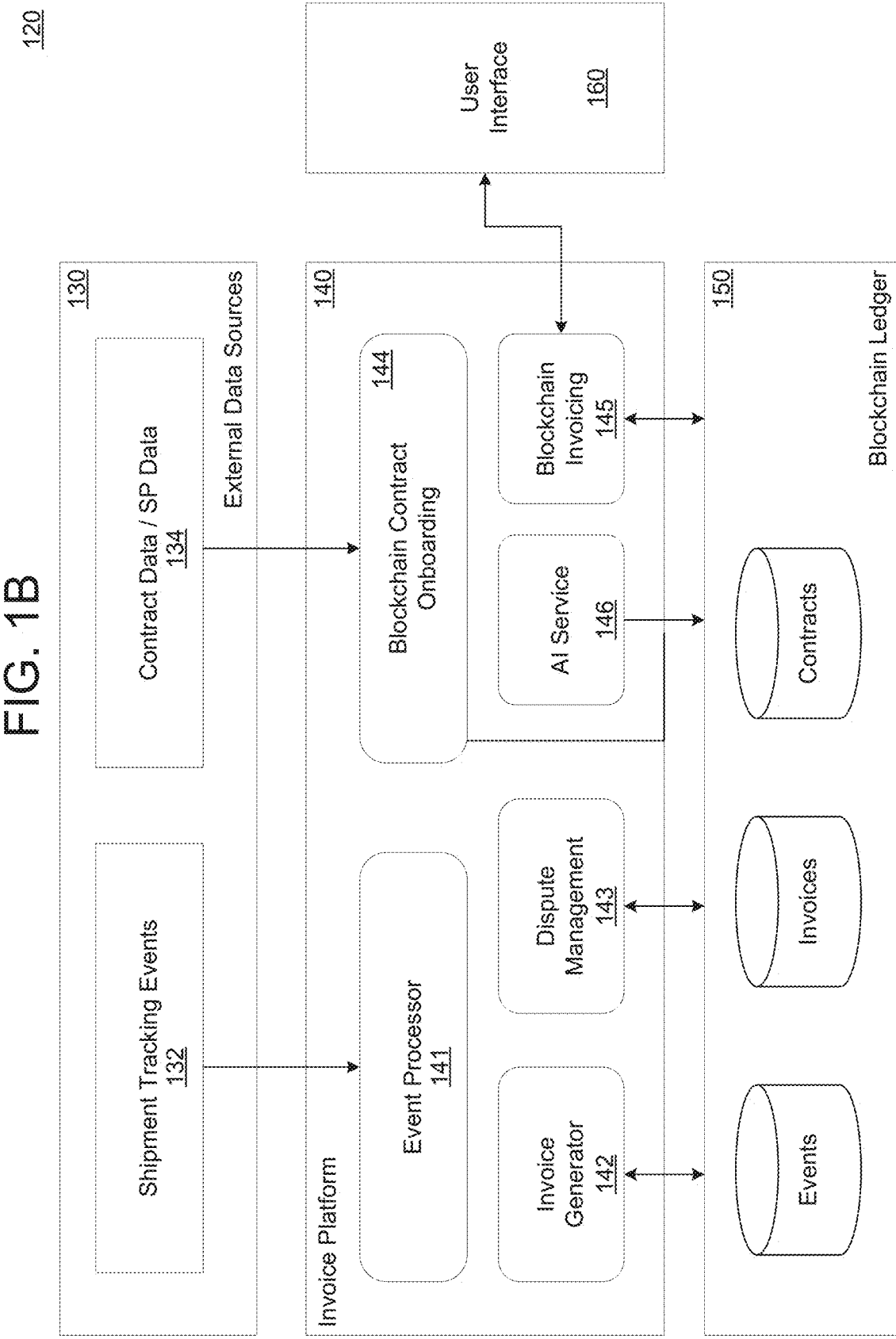
FIG. 1B is a diagram illustrating a blockchain-based e-invoicing platform according to example embodiments.

FIG. 1B illustrates a blockchain-based e-invoicing platform 120 according to example embodiments. The blockchain-based e-invoicing platform 120 may generate e-invoices for a carrier of goods such as from a point of origin to a destination. The generation of the e-invoice may be based upon real-time shipment tracking information that is acquired from a blockchain and pre-agreed service contract rates between the shipper and the carrier. The platform 120 may enhance the e-invoicing process efficiency and lower costs of shippers and carriers participating in global trade. Organizations may adopt the blockchain-based e-invoicing platform 120 to reduce the number of disputes on invoices, reduce dispute resolution time, and provide real-time auditing.

Referring to FIG. 1B, the platform 120 may receive data from external data sources 130 including shipment tracking events 132 and contract data 134 and/or service provider data. The shipment tracking events 132 may include milestone events that are detected and recorded by participants of the supply chain that are also participants of the blockchain network. The contract data may include the terms and conditions between a shipper and a carrier, etc.

An event processor 141 may obtain details of shipments and their real-time tracking events from external shipment tracking systems. The event processor 141 may provide an adaptor for receiving customized shipment events. In addition, the event processor 141 may tracks shipments from booking until delivery (shipment lifecycle management) using real-time events from the blockchain ledger, and map shipments to shipping lanes (lane identification) as the service contract terms may be specified per lane. This mapping is later used in invoice generation. Furthermore, the event processor 141 may be used to identify whether an incoming shipment needs to be considered for processing (timestamp tracking), and subsequently call the smart contract for invoice generation.

An invoice generator 142 is a chaincode component that implements various smart contract modules that help simulate the global container shipping process workflows related to invoice generation and dispute management. For example, a smart contract module may generate a list of e-invoices/fees for a given shipment (using service contract rates & real-time shipment tracking events). A smart contract module may add a missing fee to an existing e-invoice. A smart contract module may implement functions to create/raise a dispute, add comments with supporting documents to a dispute, update a dispute, resolve (accept/reject) a dispute. If there are any changes to the service contract rates, and if these changes are to be applied to the past shipments, then the smart contract may update the existing e-invoices for the shipments of interest while using the same shipment tracking events existing on the blockchain ledger. A smart contract module may finalize a fee post which disputes are not allowed. A smart contract module may auto-approve fees with no disputes beyond a threshold number of days. A smart contract module may check service contract rates for their validity.

A blockchain invoicing module 145 may implement a set of REST APIs to interact with the other components of the e-invoice generation system including the API service 146 and cron jobs that invoke smart contracts. Onboarding APIs may be used to onboard and manage shipping lanes. Query APIs may be used to query shipment data such as milestone events and generated e-invoices from the blockchain ledger. Retrospective compute APIs may be used to compute fees retrospectively following changes in the service contracts. User management APIs may be used to manage the users of each participating organization on the blockchain network. Notification APIs may be used to manage the subscription to the user alert notifications. Status APIs may be used for increased user experience (e.g., transaction status monitoring, and connecting with the client ERP systems for downstream processing like payment settlement of generated invoices). Cron jobs may be used to invoke smart contract functions for the invoice/fee generation of each shipment.

A dispute management module 143 may provide APIs for the user to create/update a dispute, add comments on an existing dispute, and resolve a dispute (accept/reject). These APIs may call a smart contract module internally. This component also provides an API to finalize any fee in case of no associated disputes with the fee.

A blockchain ledger 150 may store the data shared among blockchain network peers. It includes real-time shipment tracking events, invoices (generated e-invoices/fees), and contracts (contract rates between shippers & carriers).

The blockchain invoicing module 145 may provide a user interface 160 for the users to interact with the system. For example, a Manage Invoices/Fees module may provide a view and manage the computed fees along with their lineage details (which includes the shipping milestones used during the fee computation) for the shipments of interest to the user. A manage disputes module may be used to raise disputes and subsequently manage them. A manage service contracts interface may enable a user to add shipping lane contracts, and subsequently, manage them.

A blockchain contract onboarding module 144 may consume service contract details (e.g., as EXCEL files, etc. with no standardized document template format) from an external data source 130 and transform them into a format as required by onboarding APIs of the user interface 160. The blockchain smart contracts may generate e-invoices based on various models including a lane model, an invoice model, a fee model, a milestone model, a rate model, and the like. As just one example, the lane model may represent a global shipping lane. It may capture the origin/destination location details, incoterms, service type, freight legs, service providers involved in each leg and their SCAC codes, and invoice generation models for each service provider. Further, it captures the invoice currency and exchange rate specification. Since the shipment origin and destination belong to different countries in case of global shipping, service contracts will be established in local currency while shippers paying the fees can use a different currency. By capturing the exchange rate specification, it is possible to present the invoice aggregate amount in a single currency as required for payments.

According to various embodiments, the platform 120 may also include an AI service 146 that includes one or more AI models for predicting future milestone events. The AI models may also be used to predict planned and unplanned charges to be added to the e-invoice based on the predicted future milestone events and other factors such as weather, status of the shipment, progress of the shipment, the origin, the destination, and the like. The predicted future milestone events and the predicted charges may be used by the blockchain invoicing module 145 to generate the accelerated e-invoice.

In some embodiments, a shipment may be mapped to a particular shipping lane from among a plurality of possible global shipping lanes. For example, a shipping lane may specify an origin, a destination, carriers, intermediate ports, and the like. Here, the platform 120 may include a plurality of different AI models for a plurality of different shipping lanes. In this example, an AI model may correspond to only one of the shipping lanes, however, embodiments are not limited thereto and the AI model may be universal across all shipping lanes. In some embodiments, the shipping lane that is identified may control which AI model or models are used by the platform 120 to predict milestone events and also to predict charges.

In some embodiments, the invoice generator 142 may interact with the AI service 146 to iteratively update the e-invoice of a carrier as the carrier progresses with a shipment from a source to a destination. Here, the invoice-generator 142 may receive sensor data, scans, messages, etc. identifying information about a shipment and its progress including milestone events that are detected. In response, the invoice generator 142 may trigger the AI service to compute future/likely charges. The invoice generator 142 may update an e-invoice for the carrier including any new charges (deterministic, predicted, etc.) Furthermore, a factoring organization can pay any new charges added to the e-invoice each time the e-invoice is updated or a periodic intervals.

Figure 2A:
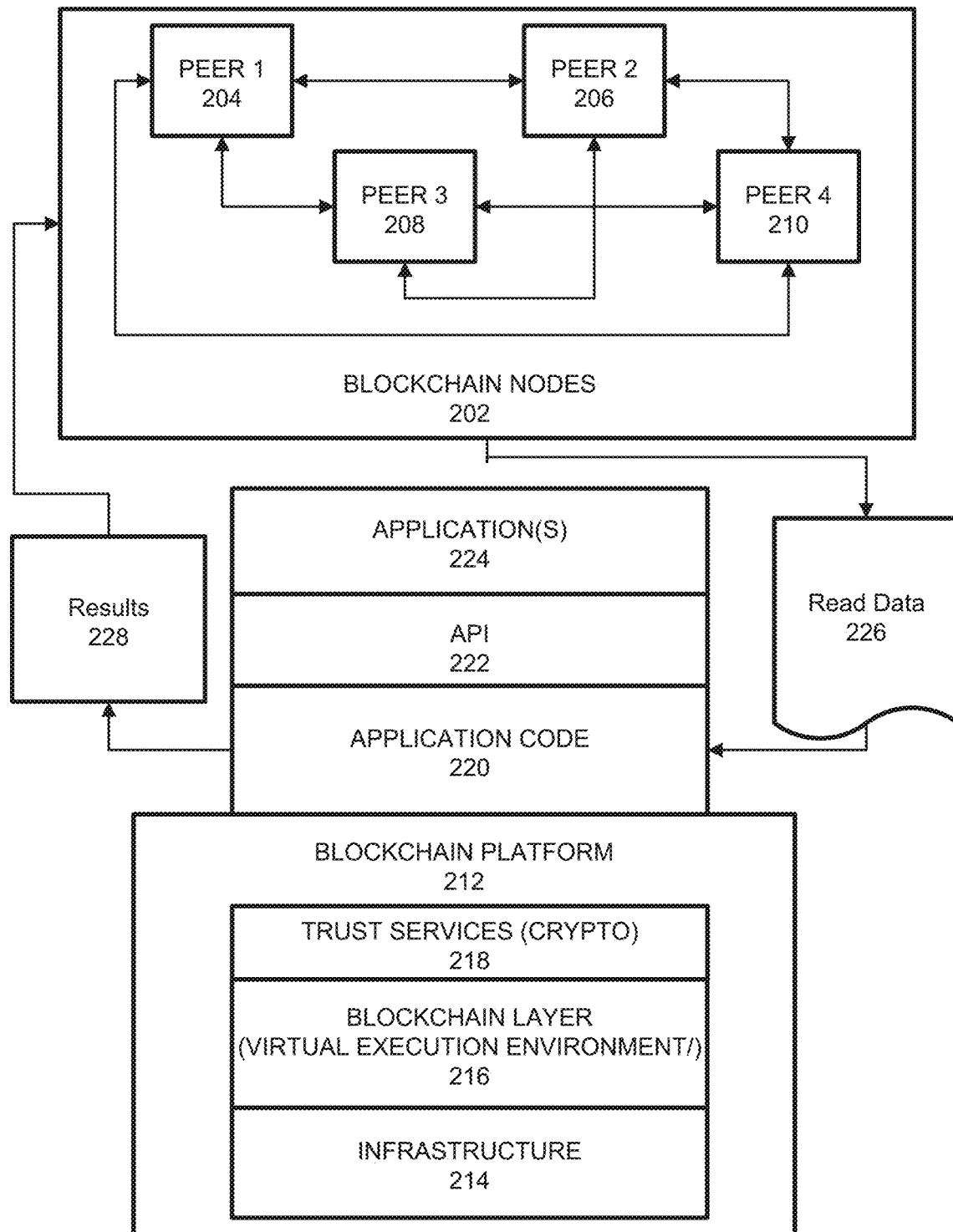
FIG. 2A is a diagram illustrating an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the smart contract (or chaincode executing the logic of the smart contract) may read blockchain data 226 which may be processed by one or more processing entities (e.g., virtual machines) included in the blockchain layer 216 to generate results 228 including alerts, determining liability, and the like, within a complex service scenario. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract logic which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into one or more blocks within the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation (e.g., the logic) of a smart contract. For example, the chaincode may include a packaged and deployable version of the logic within the smart contract. As described herein, the chaincode may be program code deployed on a computing network, where it is executed and validated by chain validators together during a consensus process. The chaincode may receive a hash and retrieve from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
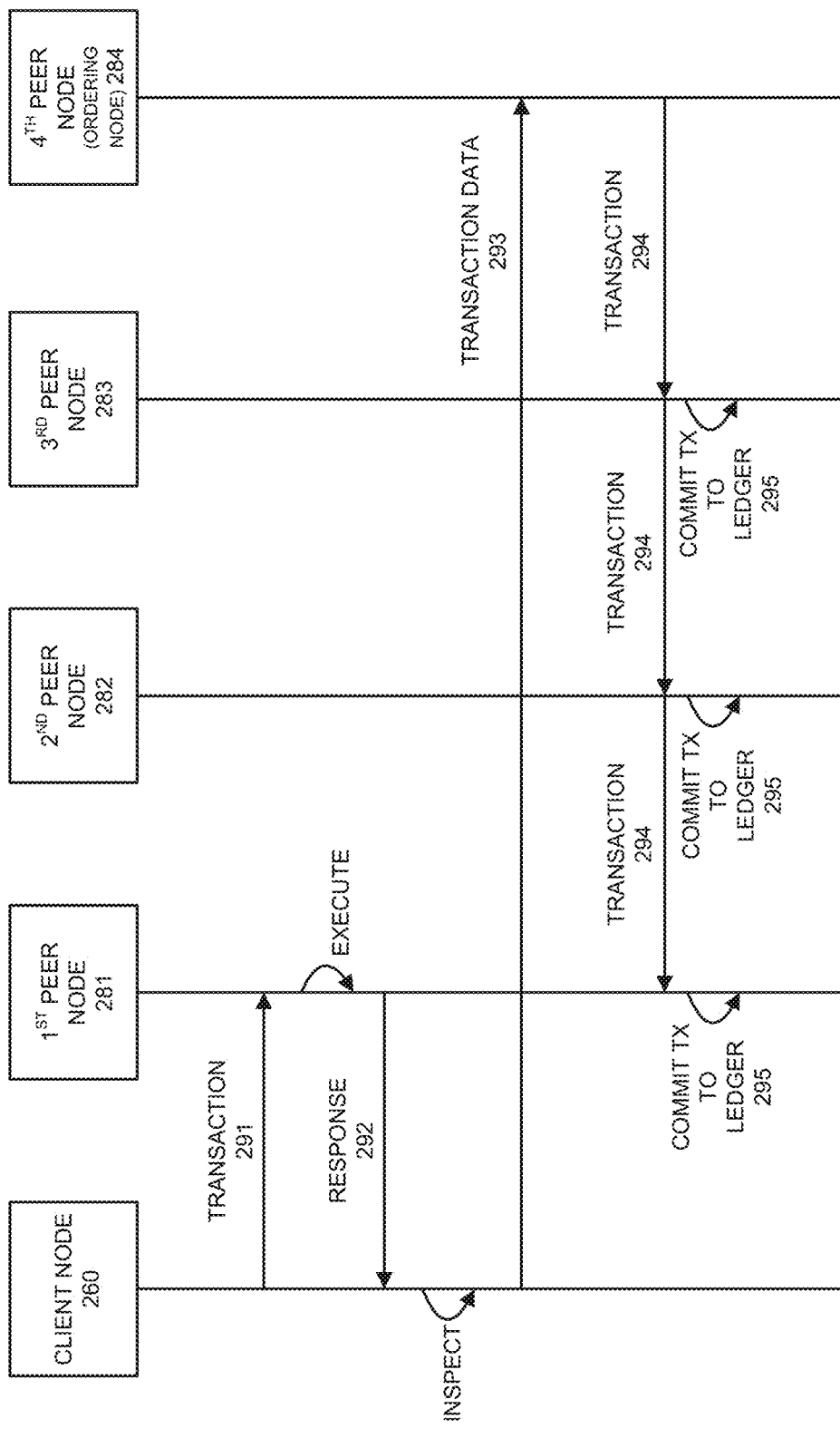
FIG. 2B is a diagram illustrating a blockchain transactional flow among nodes, according to example embodiments.

FIG. 2B illustrates an example of a blockchain transactional flow 250 between nodes of the blockchain in accordance with an example embodiment. Referring to FIG. 2B, the transaction flow may include a client node 260 transmitting a transaction proposal 291 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). Here, the endorsing peer 281 may determine whether or not to endorse the transaction proposal. The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the signatures of the endorsing peers and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction proposal and broadcasts the transaction proposal and response within a transaction message to the ordering node 284. The transaction may contain the read/write sets, the endorsing peer signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks are delivered from the ordering node 284 to all peer nodes 281-283 on the channel. The data section within the block may be validated to ensure an endorsement policy is fulfilled and to ensure that there have been no changes to ledger state for read set variables since the read set was generated by the transaction execution. Furthermore, in step 295 each peer node 281-283 appends the block to the channel's chain, and for each valid transaction the write sets are committed to current state database. An event may be emitted, to notify the client application that the transaction (invocation) has been immutably appended to the chain, as well as to notify whether the transaction was validated or invalidated.

In the example of FIG. 2B, the client node 260 and each of the blockchain peers 281-284 may use a verifiable credential as a signature. As the transaction moves through the different steps of FIG. 2B, each of the client node 260 and the blockchain peers 281-284 may attach their respective VC to a step that they have performed. In this example, each of the blockchain peers 281-284 may include a set of VCs (e.g., one or more VCs) that provide identity and membership information associated with the blockchain peers 281-284. For example, the client node 260 may include a verifiable certificate with a claim issued by a MSP of the blockchain network that identifies the client as a member for transacting on the blockchain. As another example, the blockchain peers 281-283 may include VCs that identify the blockchain peers 281-283 as endorsing peers of the blockchain. Meanwhile, the blockchain peer 284 may include a VC that identifies the blockchain peer 284 as an ordering node of the blockchain. Many other VCs are possible. For example, particular channels on the blockchain (e.g., different blockchains on the same ledger) may require different VCs in order to serve as a client, a peer, an endorser, and orderer, and the like. As another example, different types of transactions and/or chaincodes may require a separate VC by the clients, the peers, etc. For example, a client may only submit a transaction to invoke a particular chaincode if the client has a VC identifying the client has authority to use such chaincode.

Figure 3A:
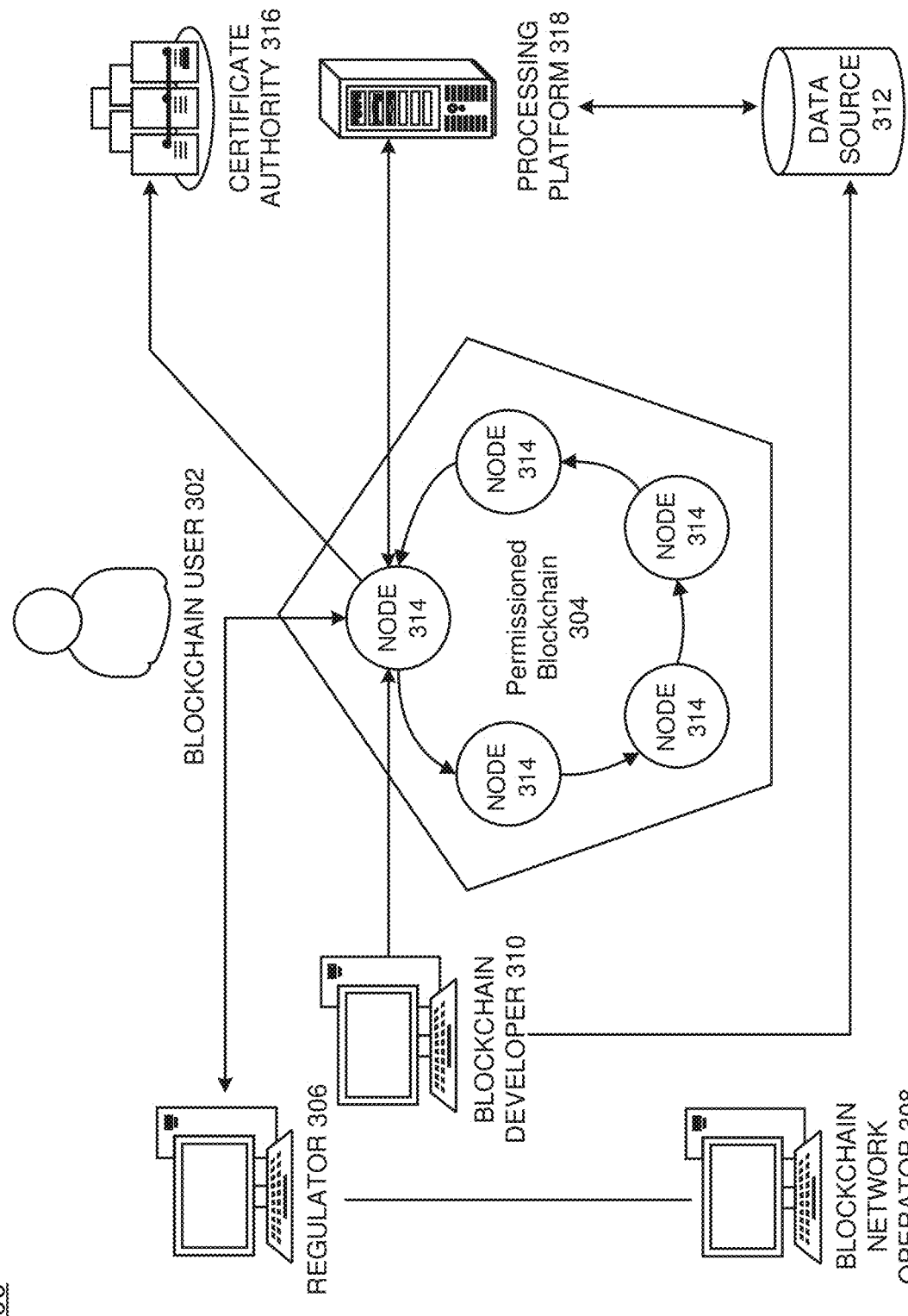
FIG. 3A is a diagram illustrating a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
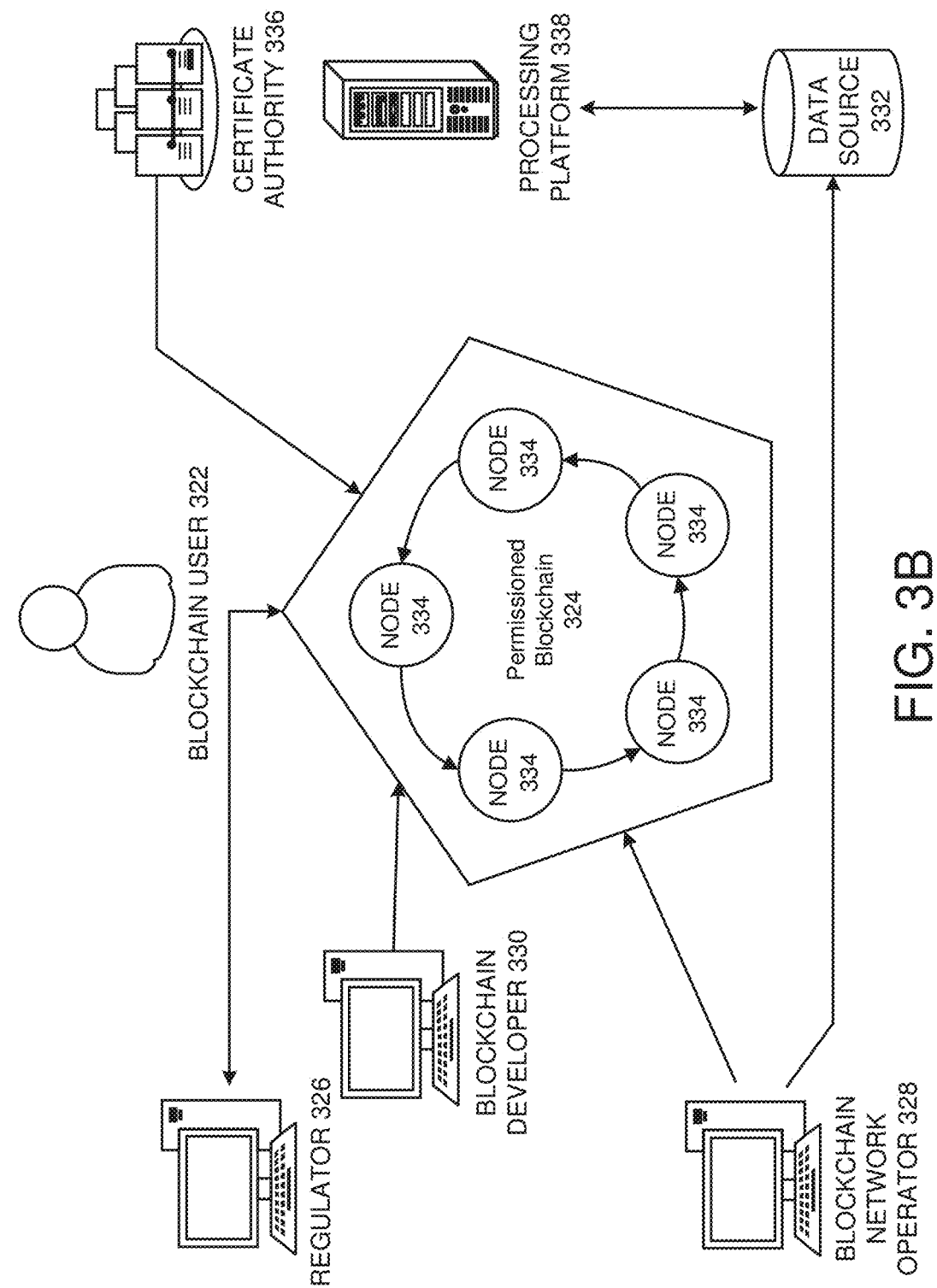
FIG. 3B is a diagram illustrating another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
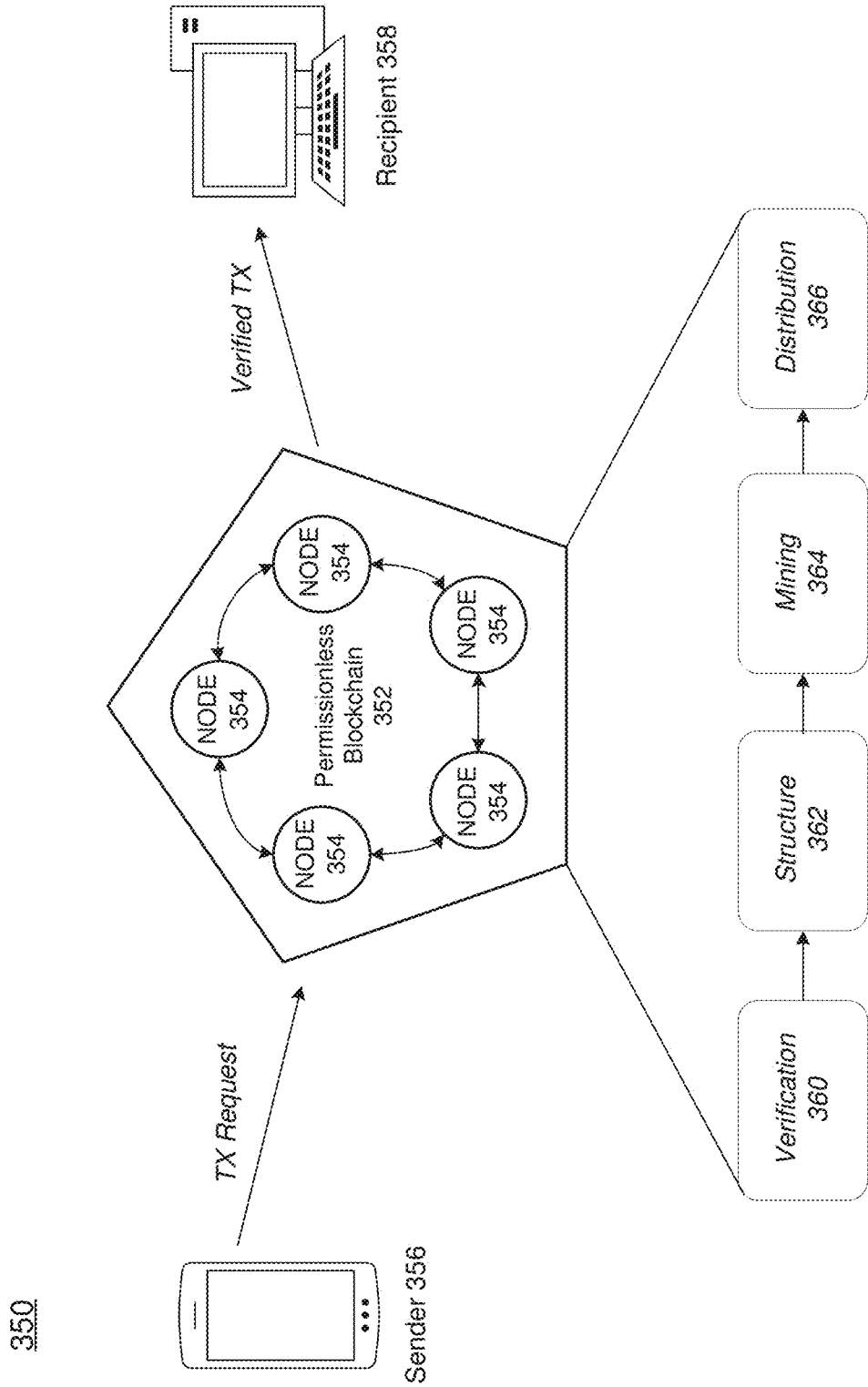
FIG. 3C is a diagram illustrating a permissionless network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

According to various embodiments, an accelerated e-invoice may be generated and used to pay a carrier of a shipment for a contract to ship a cargo from a point of origin to a destination prior to the cargo reaching its destination. In other words, the e-invoice may include an estimated amount of fees for the contract before full performance of the contract has been finished by the carrier. In some embodiments, the payments may be performed in partial amounts (chunks). For example, each time the e-invoice is updated another partial payment may be made by the factoring organization to the carrier.

As an example, a carrier and a shipper may agree on different charges involved in a cargo transportation process, and a rate at which each charge is invoiced. This is referred to as a "service contract agreement", and this is stored on a blockchain network where the carrier and the shipper are part the blockchain network. For example, the service contract agreement may be stored with the contract data on the blockchain ledger 150 shown in FIG. 1B. The following are examples of steps that may be performed as part of an e-invoice generation process performed by the e-invoicing platform 120 shown in FIG. 1B.

a. Carrier and shipper agree on different charges/terms involved in a cargo transportation process, and a rate at which each charge is invoiced. This is called the "service contract agreement", and may be stored on a blockchain ledger of a blockchain network where the carrier and the shipper are part of the blockchain network.

b. A part of an e-invoice can be computed directly using some contract rate, or using the contracted rate together with container tracking events. For example, a demurrage charge may be computed using the contracted rates and a container events. Here, container events help determine the waiting time of container in a port terminal which is needed for the computation of demurrage charge.

c. The charges to be included in an carrier invoice are pre-identified as part of the service contract agreement.

d. Goods are packed, and the packed shipment is loaded into a container. The container is picked up by the carriers. Handover of the container may happen from one carrier to another carrier as the container movement progresses (e.g., origin land carrier performs a handover of the container to an ocean carrier, and the ocean carrier performs a handover of the container to the destination land carriers, etc.)

e. The progress of the container movement from origin to the destination is tracked by different parties (land carriers, ocean carriers, port authorities, drayage providers, etc.) with the use of container events, over the course of the container transportation by different carriers (e.g., land carriers, ocean carriers, etc.). The container events are stored on blockchain, so that it provides visibility into the current state of the container to the different parties interested in the container tracking.

f. Using the real time container tracking events, predicted events, and the service contract agreements available on blockchain, a smart contract(s) running on one or more of the blockchain peers may generate accelerated e-invoices.

g. An accelerated e-invoice can be computed based on actual events and predicted events which are stored on the blockchain by a smart contract before completion of the goods delivery (in which case the e-invoice may not contain all the charges). In some cases, the accelerated e-invoice may be a partial e-invoice or a complete e-invoice for services rendered.

h. It's possible to compute the e-invoice multiple times at different points as the container movement progresses (e.g., before the vessel departure at origin port, after the vessel arrival at the destination port).

i. An AI model may be used to find a predicted container event in the future.
  i. E.g., using all the container tracking events till the vessel (ocean carrier) departure at the origin terminal, it's possible to estimate the vessel arrival at the destination terminal.

j. An AI model can estimate the occurrence of an event many times as the container movement progresses.
  i. E.g., Vessel arrival at destination terminal can be computed by the AI model once after the occurrence of "container loaded on vessel" and later after the occurrence of "vessel departure at the origin".
  ii. Essentially the estimation of a container event by AI model can happen multiple times till the actual occurrence of the event itself.

k. Each time there is a change in the estimate of occurrence of a container event, the smart contract on blockchain can update the accelerated e-invoice by considering the updated estimated events and service contract agreements.

l. Typically, carriers get paid within 90-days of the actual final e-invoice generation.

m. However, in this case, the accelerated e-invoice is generated on blockchain via smart contracts that shippers and carriers have previously agreed to. Therefore, both shippers and carriers can verify any generated e-invoice. For example, both the shipper and the carrier may have blockchain peers as part of the blockchain network enabling access to the service contract agreements and the container tracking events and the smart contract logic used in the computation of the charges/invoices.

n. The factoring organization may make partial payments to the carrier each time the e-invoice is updated, or at periodic intervals. The final partial payment may happen after the completion of the goods delivery and all the previous partial payments happen before the completion of the goods delivery. The final partial payment may be known as the settlement payment of the e-invoice by the factoring organization to the carrier.

o. The blockchain peers continue to monitor the shipment and perform estimates of the milestones of the shipment.

p. The AI model considers the actual container events, and the estimated events from different blockchain peers in the process of estimating future container events.
  i. This process also helps for further learning/training the AI model.

In the example embodiments, an accelerated e-invoice can be generated based on verifiable events tracked by blockchain peers of a blockchain network and recorded to a blockchain ledger. In addition, the accelerated e-invoice can be generated based on predicted events (i.e., future events/charges) that are predicted using AI models. Here, the AI models may use logic that is previously agreed to by the carrier and the shipper. Also, the logic may be stored on the ledger along with the data used to make the predictions. Therefore, any party to the blockchain network can verify the AI model logic by executing the AI logic from the ledger based on the data stored on the ledger.

Traditionally, a factoring organization pays a carrier within 24-hours (or 48-hours) after cargo delivery completion (i.e., leaving the cargo at its intended destination specified by the contract). Here, the shipper typically pays the factoring organization within 60 days after goods delivery completion. However, according to the example embodiments, a factoring organization may pay partial amounts or even full amounts of the freight delivery costs before the goods delivery completion has finished. If necessary, the factoring organization may pay for any remaining balance amount to the carrier within 24-hours (or 48-hours) after goods delivery completion with factoring. Here, the shipper still pays to the factoring organization within 90 days after goods delivery completion. However, the carrier gets paid, at least a partial amount, significantly faster.

Figure 4A:
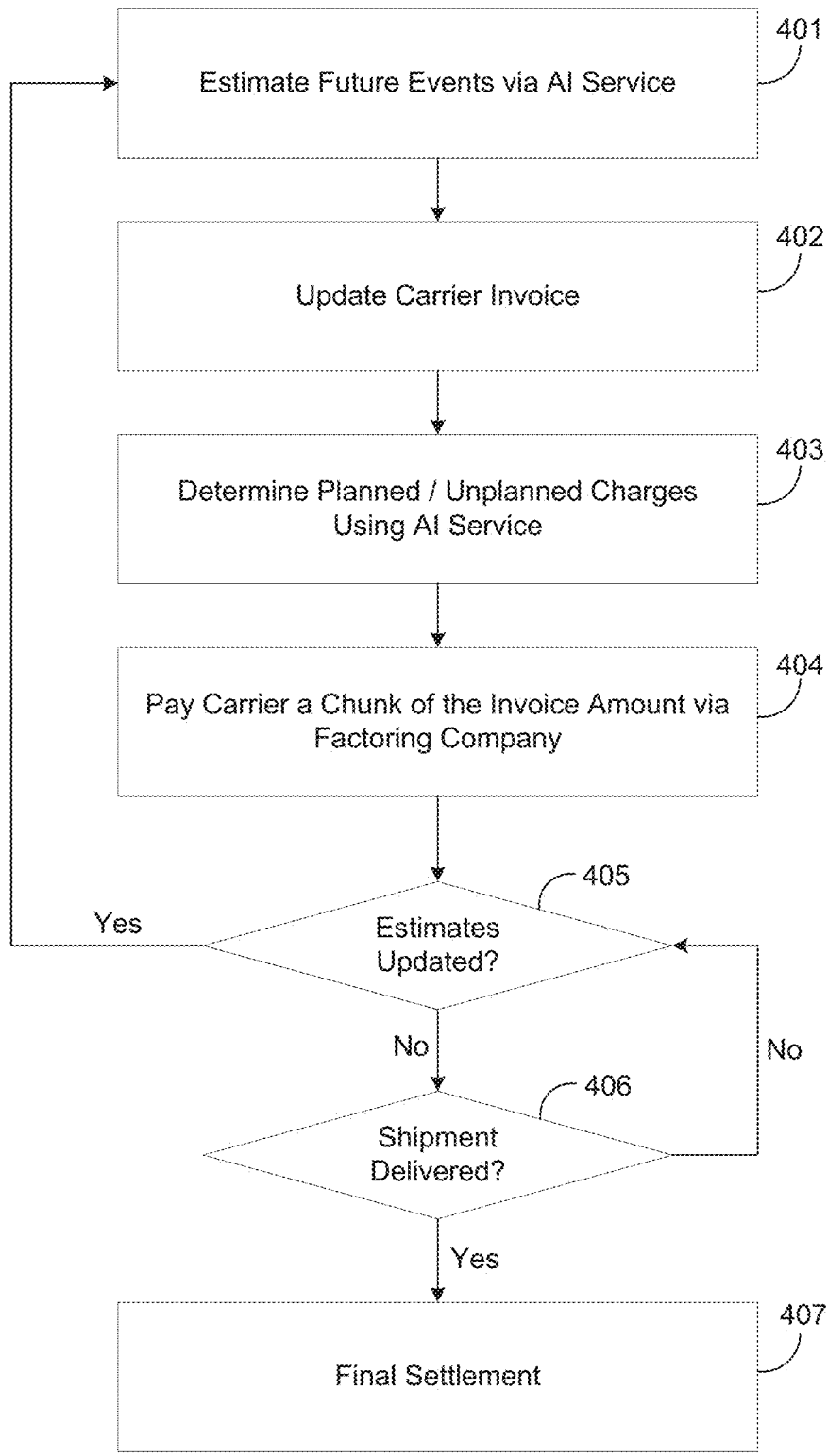
FIG. 4A is a diagram illustrating a process of generating an accelerated e-invoice according to example embodiments.

FIG. 4A illustrates a process 400 of generating an accelerated e-invoice according to example embodiments. Referring to FIG. 4A, in 401, an AI service may execute future events/predicted events of a shipment. Here, the future events may be container events, milestone events, and the like. In 402, a smart contract can generate and/or update a carrier invoice, also referred to herein as an accelerate e-invoice. The e-invoice may be generated based on a template/format of an invoice that is embedded into computer code. As another example, the e-invoice template may be in the form of a document, a spreadsheet, or the like. In 403, the AI service may predict planned and unplanned charges for the shipment based on a current progress of the shipment. Here, the current progress may be only a partial completion of the shipment (e.g., one quarter of the way there, one half of the way there, etc.) In 404, a factoring organization may be a participant on the blockchain network and may identify the newly generated accelerated e-invoice or an updated e-invoice and make a payment to the carrier accordingly. Here, the payment may be a chunk of the total invoice, or a partial payment. For example, the partial payment may represent payment for a milestone event and any additional charges that have accrued or that are predicted to accrue before a next milestone event.

In 405, the AI service may periodically update predicted events of the shipment. For example, the AI service may identify new or different events that were not previously predicted which affect the e-invoice. If such events are identified, steps 402, 403, and 404 may be repeated. Furthermore, the factoring organization may make another partial payment/payments to the carrier each time the e-invoice is updated, periodically, etc. If, however, no new events are detected, the platform monitors whether shipment of the cargo has completed in 406. If the shipment has not completed, the platform continues to check for updates in 405 on a periodic basis (e.g., hourly, daily, etc.) If the shipment has completed, a final settlement is generated in 407 which may include an additional payment from the factoring organization to the carrier or vice versa.

FIG. 4B illustrates a view 420 of a timeline of events of the accelerated e-invoicing process shown in FIG. 4A, according to example embodiments. As shown in FIG. 4B, a carrier may be paid at a first point in time 422 (i.e., within the first few days (e.g., day 4, etc.) of a 30-day shipment). Here, the payment may represent a partial payment for services rendered by the carrier. In this case, the e-invoice may be accelerated such that it includes events that have already happened plus events that are predicted to happen, and predicted costs associated with those events. In comparison to the traditional payment process which pays the carrier within 24 hours of submitting an invoice for services rendered on the day of delivery, the carrier gets paid significantly faster (27 days).

Furthermore, additional chunks of the invoice are paid to the carrier at time 424, 426, and 428, as additional milestone events are detected. Here, the e-invoice may be updated with additional charges/services rendered including actual charges and/or predicted charges.

FIG. 4C illustrates a process 430 of training and using an artificial intelligence (AI) model for predicting milestone events according to example embodiments. It should be appreciated that AI models may make different predictions. For example, another AI model or the same AI model may also predict charges that are planned and unplanned for the shipment.

Referring to FIG. 4C, an AI model 433 may be iteratively trained by executing the AI model 433 on historical event data 431 with estimated/predicted lead times and actual event data 432 with actual lead times that includes various data attributes of historical shipments. Here, the sets of event data may include origin, destination, carrier information, costs/fees incurred, types of fees, demurrage data, detention data, destination fees, etc. The more executions/iterations of the training, the more the AI model 433 may learn. As a non-limiting example, the AI model may be a machine learning model such as a recurring neural network (RNN), but embodiments are not limited thereto.

Once the AI model 433 has been trained and is now the trained AI model 434, the trained AI model 434 can be used to make predictions on shipment data 435 generated by a shipment in progress. Here, the shipment data 435 may include information about the current progress/location of the shipment, previously predicted events, charges, etc. of the shipment, and the like. The trained AI model 434 may use all of this data to generate or update predicted milestone events for the shipment. These milestone events may be used to generate an accelerated e-invoice for the shipment based on an aggregation of predicted events and costs of those events.

FIG. 4D illustrates a process 440 of a smart contract 450 of the blockchain-based e-invoicing platform generating charges according to example embodiments. Referring to FIG. 4D, the smart contract 450 may implement logic that decides on which of the unplanned charges of a carrier invoice can be included for factoring (by using the respective occurrence probabilities of the unplanned charges generated by the AI service provider). Additional smart contracts may be used to access the historical data on which invoices were considered by the financial organizations for factoring and analyze if financial organizations are biased towards specific carrier organization's invoices over other carrier organization's invoices.

Referring to FIG. 4D, the smart contract 450 receives the predicted milestone events 435 from the AI service. Here, the smart contract 450 includes invoice generation logic 452 which includes costs/charges for each of the different parts of the invoice. The smart contract 450 may also include logic of predicting/estimating charges 454 and accuracy determination logic 456 which determines an accuracy of the predictions. The resulting output from the smart contract 450 may be approved charges for an accelerated e-invoice.

Figure 5:
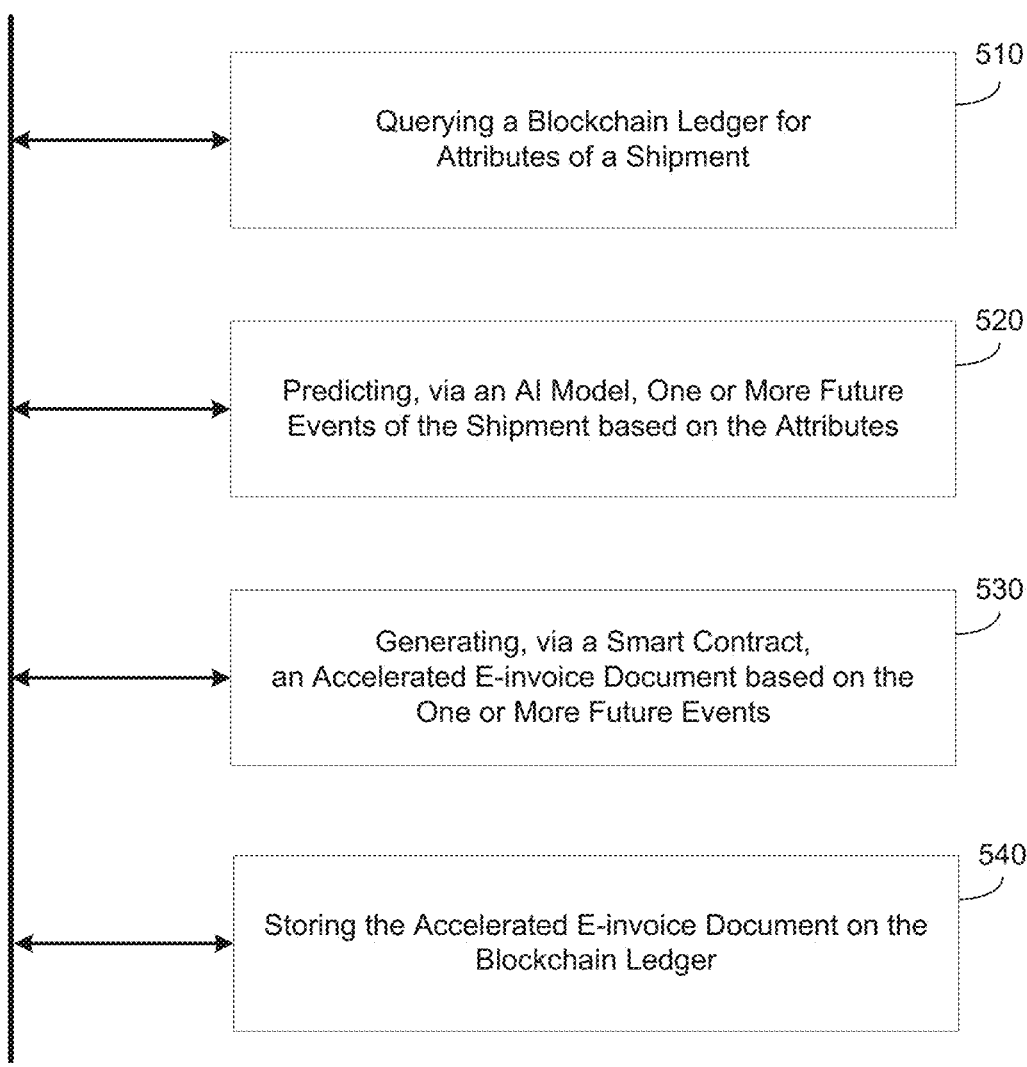
FIG. 5 is a diagram illustrating a method of generating an accelerated e-invoice according to example embodiments.

FIG. 5 illustrates a method 500 of generating an accelerated e-invoice according to example embodiments. For example, the method 500 may be performed by a blockchain peer, a smart contract, or the like. Referring to FIG. 5, in 510, the method may include querying, via an application programming interface (API), a blockchain ledger for attributes of a shipment by a carrier from an origin location to a destination location. The querying may identify a specific freight by container number or the like. In response, the blockchain ledger may return already-tracked events of a partial shipment, before the shipment has reached its final destination.

In 520, the method may include predicting, via an artificial intelligence (AI) model, one or more future events that will occur during the shipment based on the attributes of the shipment retrieved from querying the blockchain ledger. In 530, the method may include generating, via a smart contract, an accelerated e-invoice document based on the one or more future events predicted by the AI model. In 540, the method may include storing the accelerated e-invoice document on the blockchain ledger.

In some embodiments, the querying may include transmitting query to the blockchain ledger which includes an identifier of a freight included in the shipment, and receiving one or more tracked events of the freight extracted from the blockchain ledger. In some embodiments, the method may further include mapping the shipment to a predefined shipping lane from among a plurality of shipping lanes based on the origin location and the destination location. In some embodiments, the method may further include selecting the AI model from among a plurality of AI models based on the mapped predefined shipping lane from among the plurality of shipping lanes.

In some embodiments, the generating may include reading, via the smart contract, attributes of a service contract stored on the blockchain ledger and generating the accelerated e-invoice document based on the attributes of the service contract that are read from the blockchain ledger and the one or more future events predicted by the AI model. In some embodiments, the method may further include receiving progress updates to the shipment, predicting one or more additional future events based on the progress updates to the shipment, and modifying the e-invoice document based on the predicted one or more additional future events. In some embodiments, the method may further include executing a payment via the blockchain platform which transfers fees to the carrier prior to the shipment reaching the destination location. In some embodiments, the executing the payment via the blockchain platform comprises executing a plurality of partial payments at a plurality of different time intervals corresponding to a plurality of different milestone events of the shipment.

Figure 6A:
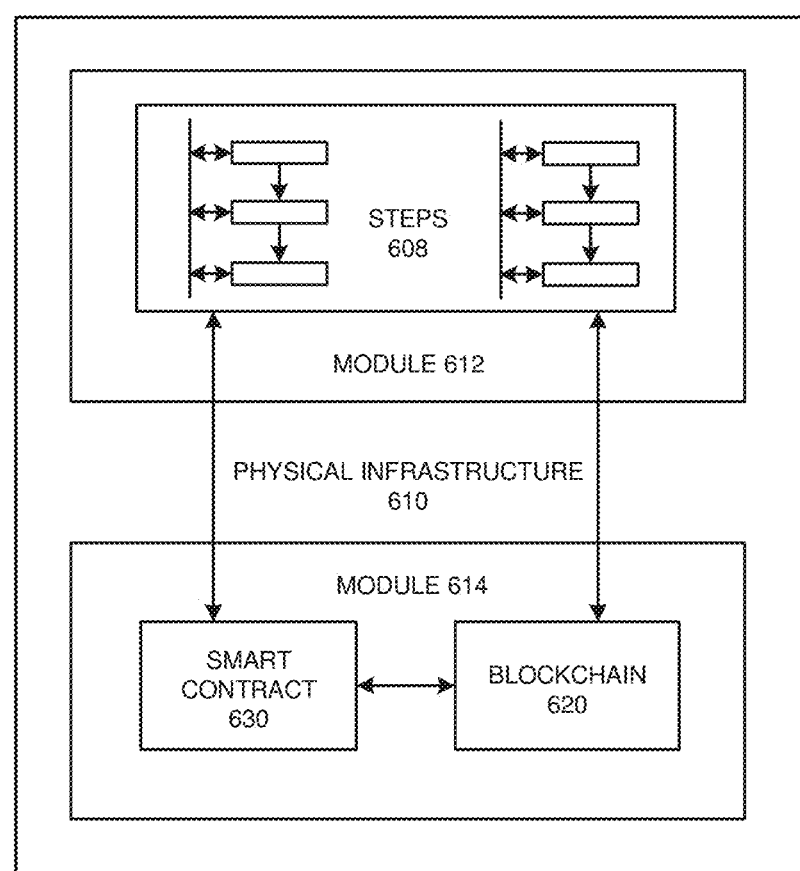
FIG. 6A is a diagram illustrating an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
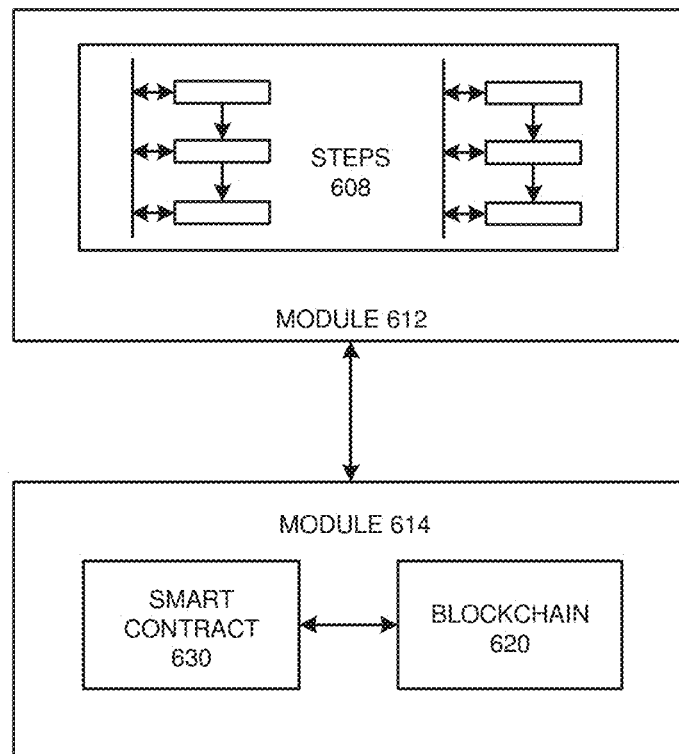
FIG. 6B is a diagram illustrating another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
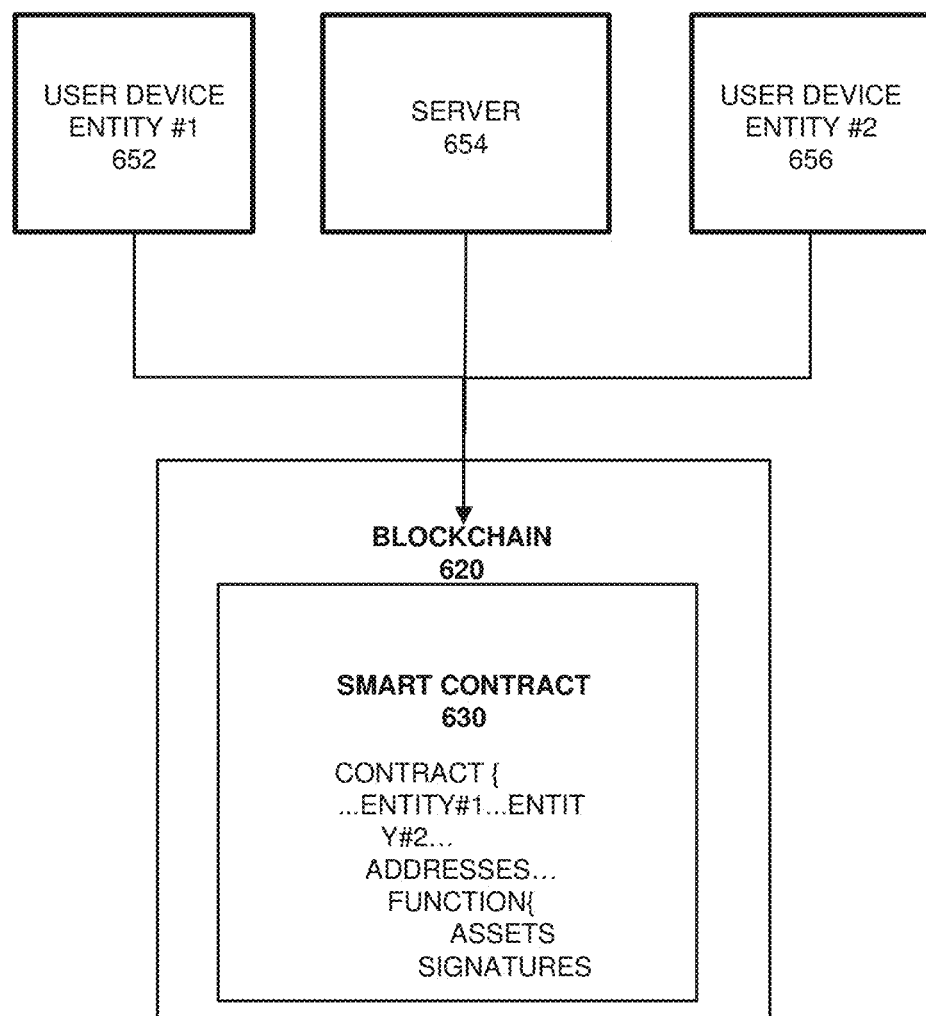
FIG. 6C is a diagram illustrating a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
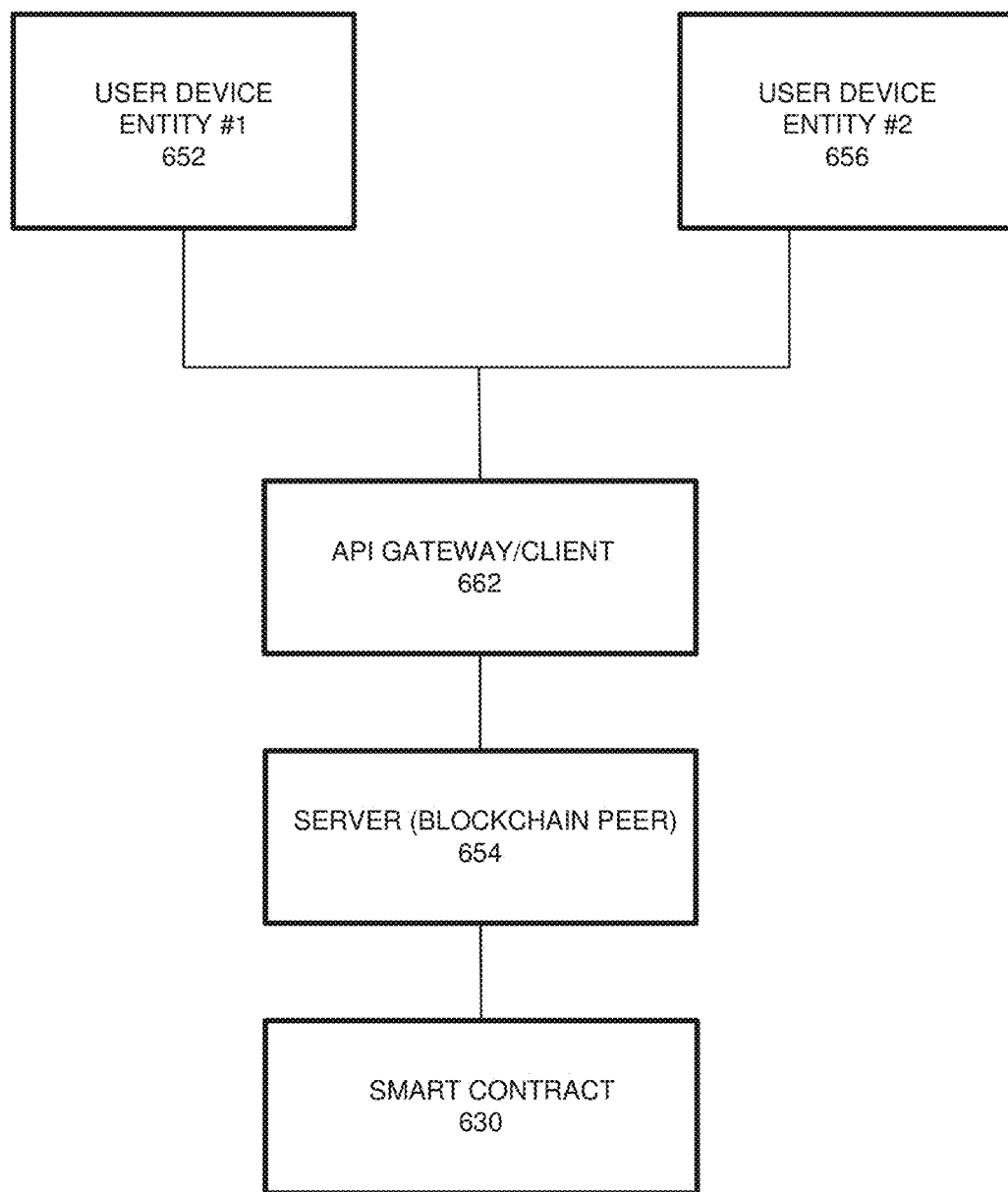
FIG. 6D is a diagram illustrating yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
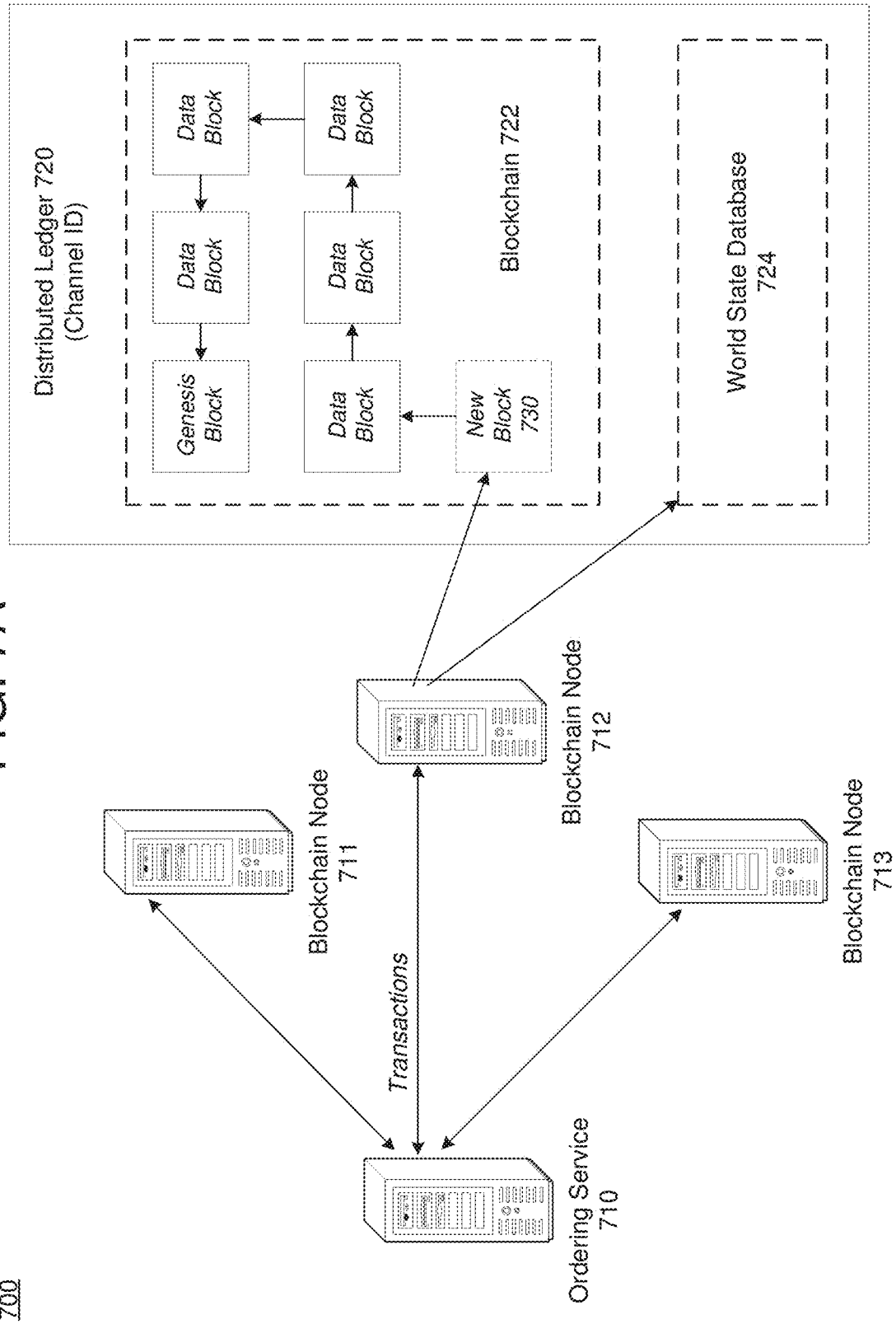
FIG. 7A is a diagram illustrating a process of a new block being added to a distributed ledger, according to example embodiments.
Figure 7B:
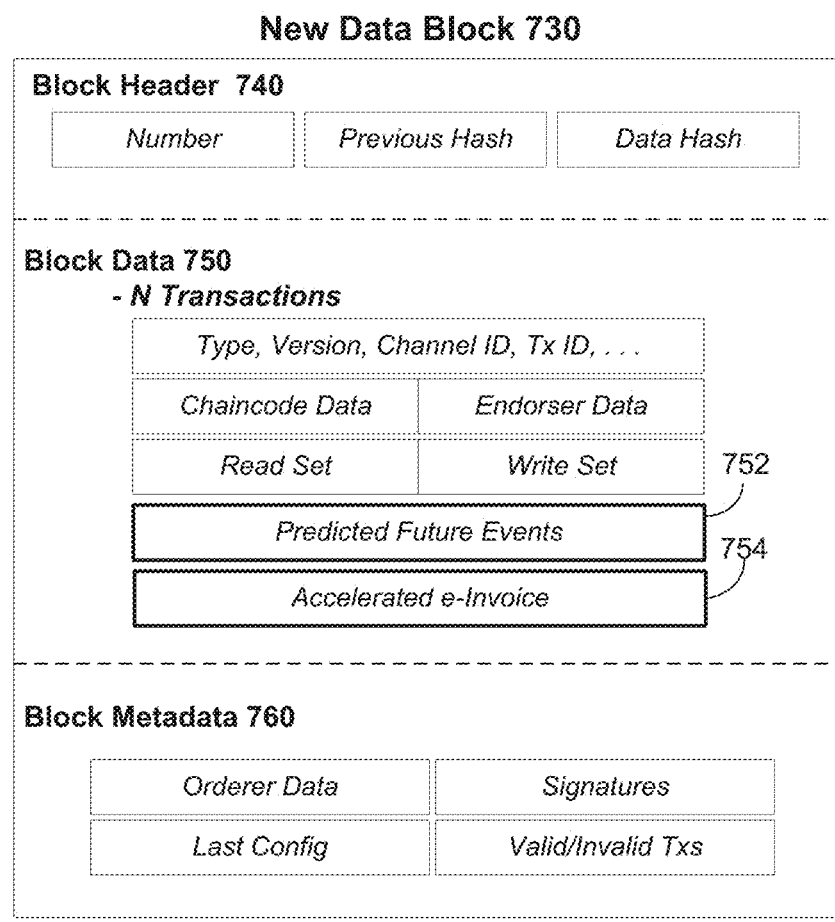
FIG. 7B is a diagram illustrating data contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750 (block data section), and block metadata 760. It should be appreciated that the various depicted blocks and their contents, such as new data block 730 and its contents, shown in FIG. 7B are merely examples and are not meant to limit the scope of the example embodiments. In a conventional block, the data section may store transactional information of N transaction (s) (e.g., 1, 10, 100, 500, 1000, 2000, 3000, etc.) within the block data 750.

The new data block 730 may include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

According to various embodiments, the block data 750 may store predicted future events 752 which are predicted by an AI model and accelerated e-invoices 754 which are created and paid before the shipment reaches its final destination. The predicted future events 752 and the accelerated e-invoices 754 are not necessarily stored together or even in the same transaction or block, but can both be stored in an immutable log of blocks (blockchain 722) on the distributed ledger 720. Some of the benefits of storing the predicted future events 752 and the accelerated e-invoices 754 on the blockchain are reflected in the various embodiments disclosed and depicted herein. Although in FIG. 7B, the predicted future events 752 and the accelerated e-invoices 754 are depicted in the block data 750, in other embodiments, the predicted future events 752 and the accelerated e-invoices 754 may be stored in the block header 740 or the block metadata 760.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions that are included in the block data 750 and a validation code identifying whether a transaction was valid/invalid.

Figure 7C:
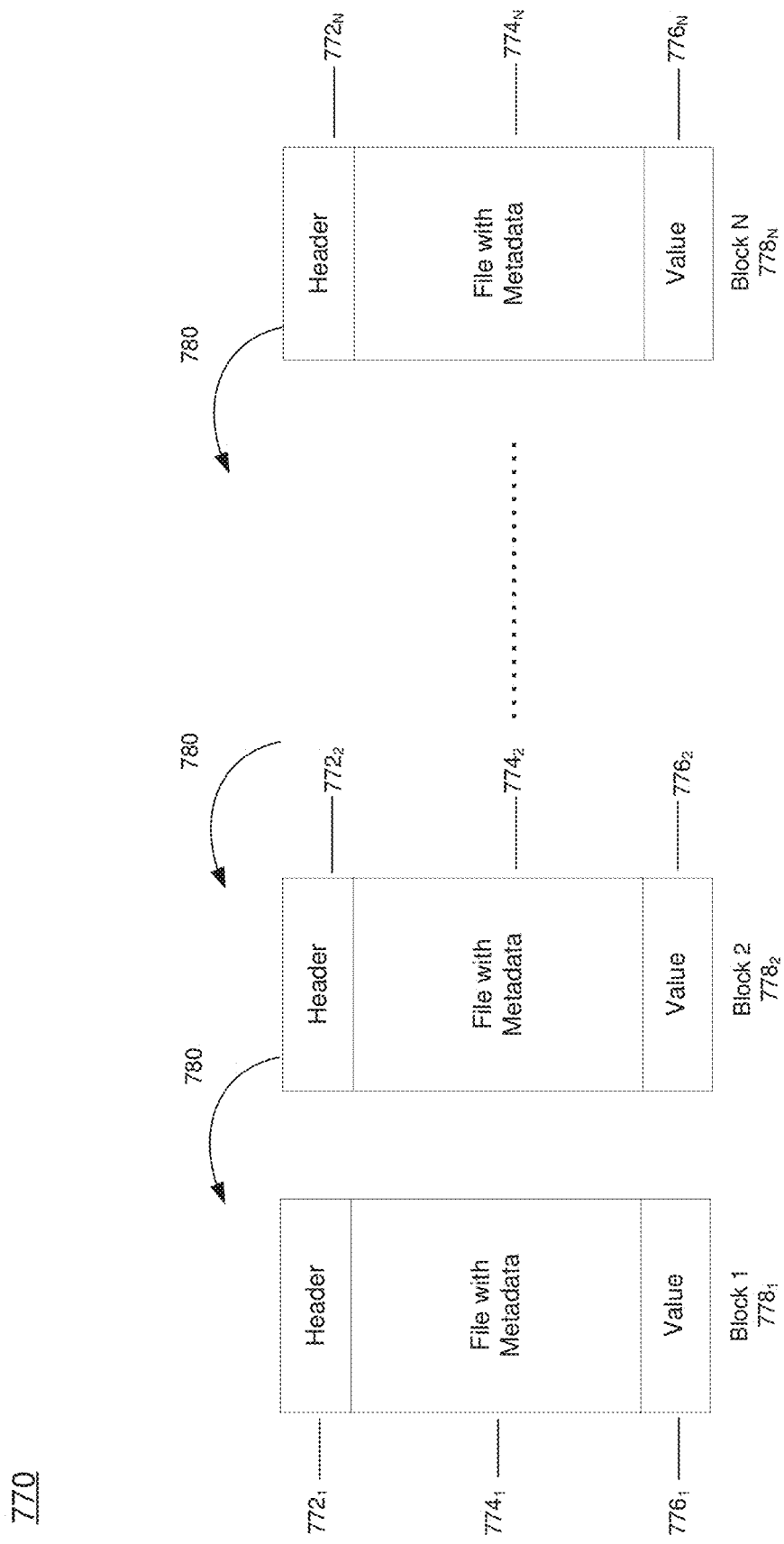
FIG. 7C is a diagram illustrating a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken into consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | . . . | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| Block N Hash Value | Block N Hash Value . . . Content |

In the example embodiment of FIG. 7C, the blockchain 770 includes a number of blocks $778_1$, $778_2$, . . . $778_N$ cryptographically linked in an ordered sequence, where $N \geq 1$. The encryption used to link the blocks $778_1$, $778_2$, . . . $778_N$ may be any of a number of keyed or un-keyed Hash functions. In one embodiment, the blocks $778_1$, $778_2, \ldots 778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, . . . , $778_N$ may be cryptographically linked by a function that is different from a hash function. For purposes of illustration, the following description is made with reference to a hash function, e.g., SHA-2.

Each of the blocks $778_1$, $778_2$, . . . , $778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:
  1) SHA-2 computed hash value for the original file
  2) originating device ID
  3) starting timestamp for the original file
  4) initial storage location of the original file
  5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
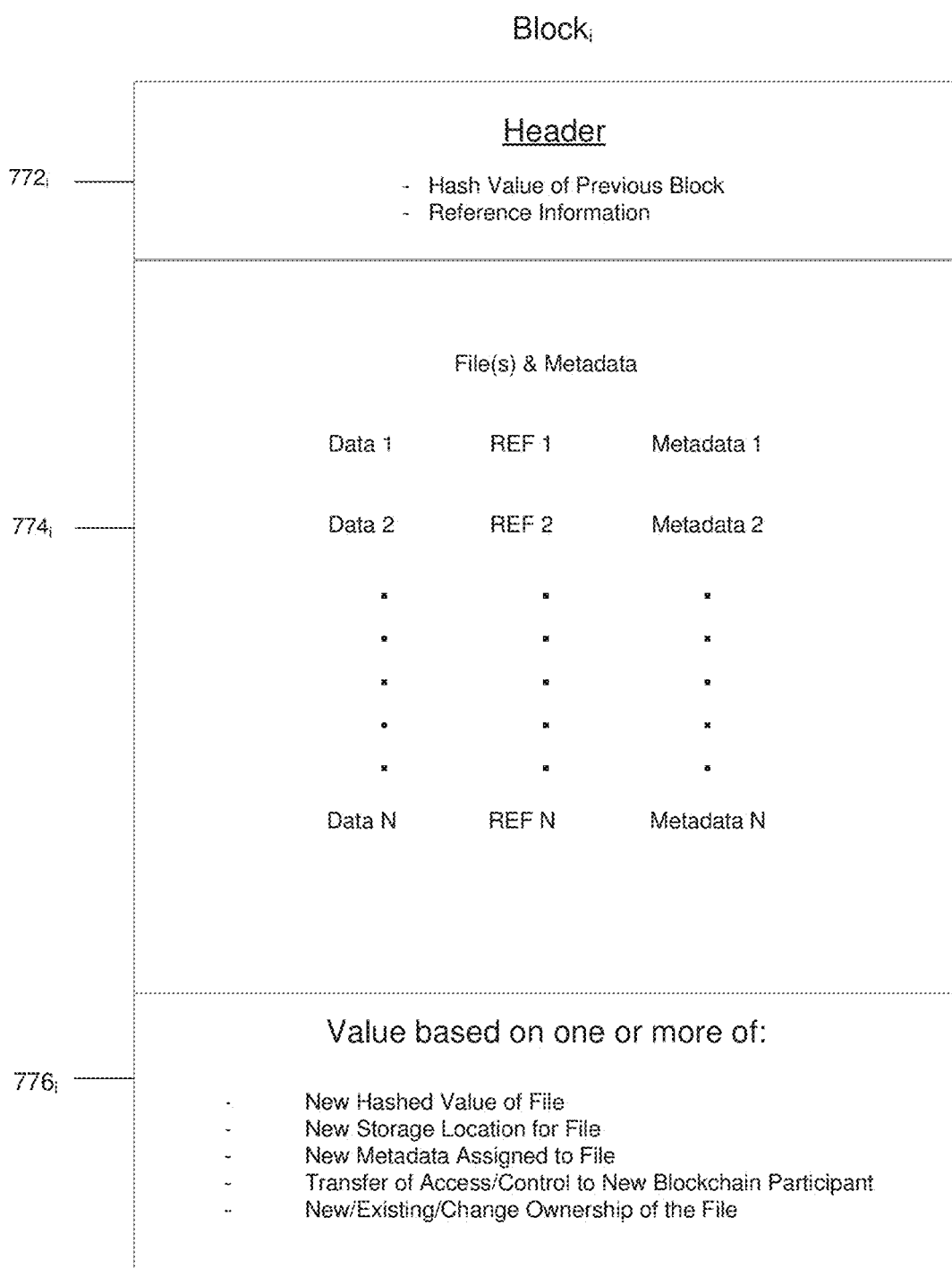
FIG. 7D is a diagram illustrating a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 7D illustrates an embodiment of a block which may represent the structure of the blocks in the blockchain 790 in accordance with one embodiment. The block, $Block_i$, includes a header $772_i$, a file $774_i$, and a value $776_i$.

The header $772_i$ includes a hash value of a previous block $Block_{i+1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_i$ includes a plurality of data, such as Data 1, Data 2, ..., Data N in sequence. The data are tagged with Metadata 1, Metadata 2, ..., Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, ..., $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8A:
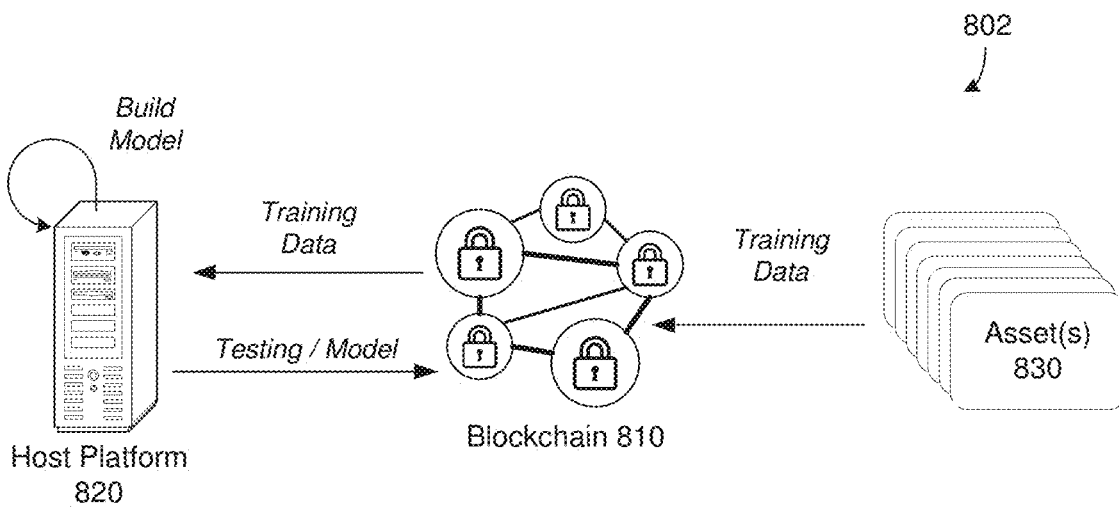
FIG. 8A is a diagram illustrating an example blockchain which stores machine learning (artificial intelligence) data, according to example embodiments.
Figure 8A:
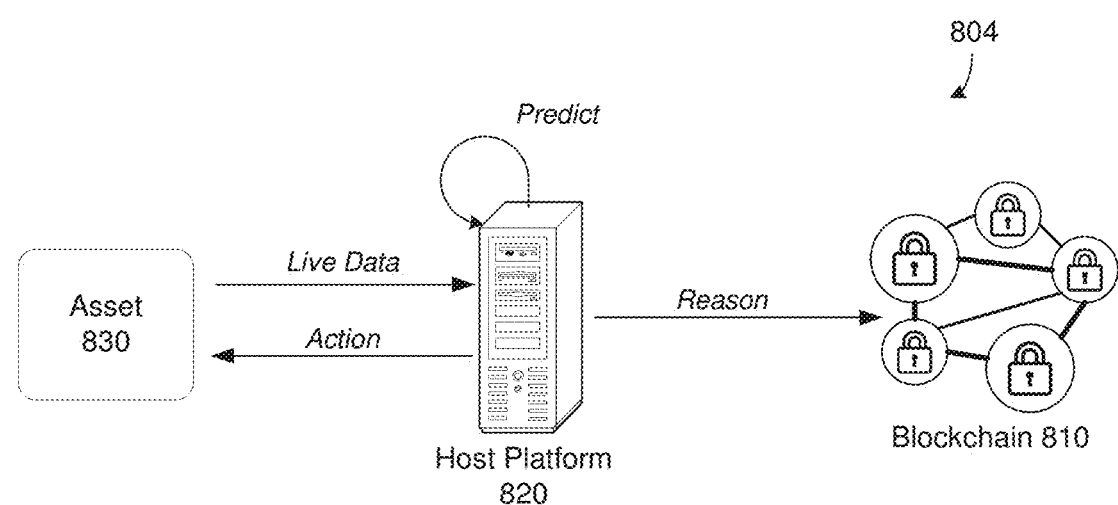
Figure 8B:
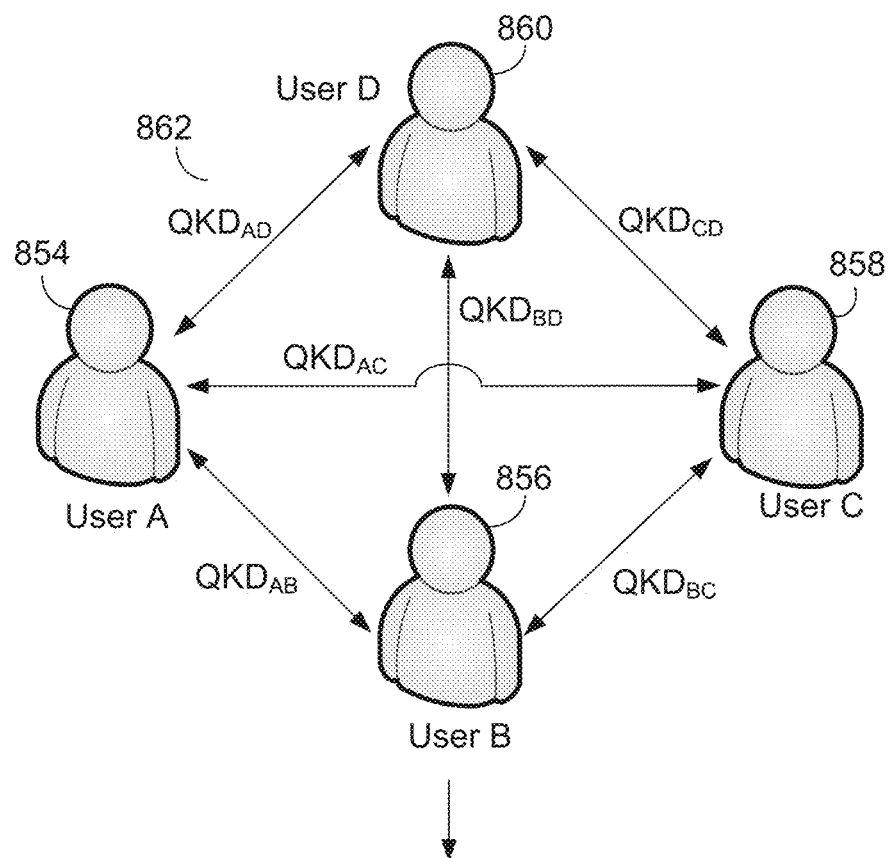
FIG. 8B is a diagram illustrating an example quantum-secure blockchain, according to example embodiments.
Figure 8B:
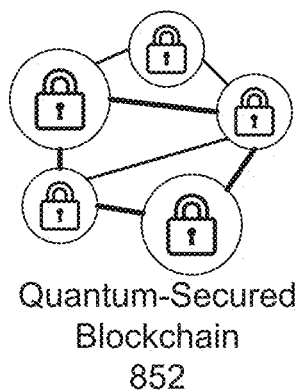

FIGS. 8A and 8B illustrate additional examples of use cases for blockchain which may be incorporated and used herein. In particular, FIG. 8A illustrates an example 800 of a blockchain 810 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 8A, a host platform 820 builds and deploys a machine learning model for predictive monitoring of assets 830. Here, the host platform 820 may be a cloud platform, an industrial server, a web server, a personal computer, a user device, and the like. Assets 830 can be any type of asset (e.g., machine or equipment, etc.) such as an aircraft, locomotive, turbine, medical machinery and equipment, oil and gas equipment, boats, ships, vehicles, and the like. As another example, assets 830 may be non-tangible assets such as stocks, currency, digital coins, insurance, or the like.

The blockchain 810 can be used to significantly improve both a training process 802 of the machine learning model and a predictive process 804 based on a trained machine learning model. For example, in 802, rather than requiring a data scientist/engineer or other user to collect the data, historical data may be stored by the assets 830 themselves (or through an intermediary, not shown) on the blockchain 810. This can significantly reduce the collection time needed by the host platform 820 when performing predictive model training. For example, using smart contracts, data can be directly and reliably transferred straight from its place of origin to the blockchain 810. By using the blockchain 810 to ensure the security and ownership of the collected data, smart contracts may directly send the data from the assets to the individuals that use the data for building a machine learning model. This allows for sharing of data among the assets 830.

The collected data may be stored in the blockchain 810 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices which write directly to the blockchain can, in certain cases (i.e., supply chain, healthcare, logistics, etc.), increase both the frequency and accuracy of the data being recorded.

Furthermore, training of the machine learning model on the collected data may take rounds of refinement and testing by the host platform 820. Each round may be based on additional data or data that was not previously considered to help expand the knowledge of the machine learning model. In 802, the different training and testing steps (and the data associated therewith) may be stored on the blockchain 810 by the host platform 820. Each refinement of the machine learning model (e.g., changes in variables, weights, etc.) may be stored on the blockchain 810. This provides verifiable proof of how the model was trained and what data was used to train the model. Furthermore, when the host platform 820 has achieved a finally trained model, the resulting model may be stored on the blockchain 810.

After the model has been trained, it may be deployed to a live environment where it can make predictions/decisions based on the execution of the final trained machine learning model. For example, in 804, the machine learning model may be used for condition-based maintenance (CBM) for an asset such as an aircraft, a wind turbine, a healthcare machine, and the like. In this example, data fed back from the asset 830 may be input the machine learning model and used to make event predictions such as failure events, error codes, and the like. Determinations made by the execution of the machine learning model at the host platform 820 may be stored on the blockchain 810 to provide auditable/verifiable proof. As one non-limiting example, the machine learning model may predict a future breakdown/failure to a part of the asset 830 and create alert or a notification to replace the part. The data behind this decision may be stored by the host platform 820 on the blockchain 810. In one embodiment the features and/or the actions described and/or depicted herein can occur on or with respect to the blockchain 810.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000s of times faster) and consequently pose a much greater threat.

FIG. 8B illustrates an example 850 of a quantum-secure blockchain 852 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 8B, four users are present 854, 856, 858, and 860. Each of pair of users may share a secret key 862 (i.e., a QKD) between themselves. Since there are four nodes in this example, six pairs of nodes exists, and therefore six different secret keys 862 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the blockchain 852 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 854-860) authenticate the transaction by providing their shared secret key 862 (QKD). This quantum signature can be attached to every transaction making it exceedingly difficult to tamper with. Each node checks their entries with respect to a local copy of the blockchain 852 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a Byzantine agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 852. In one embodiment the features and/or the actions described and/or depicted herein can occur on or with respect to the blockchain 852.

Figure 9:
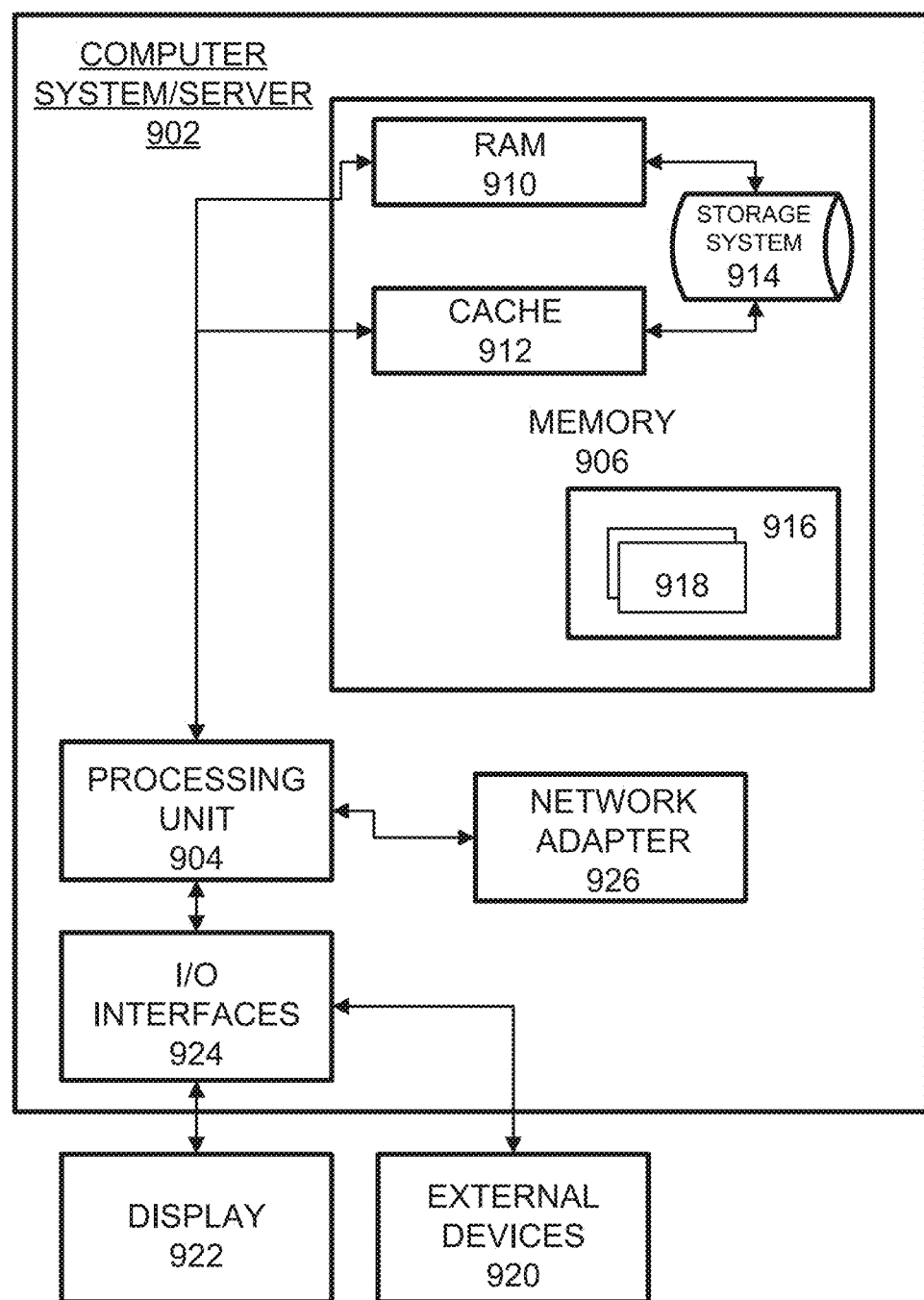
FIG. 9 is a diagram illustrating an example system that supports one or more of the example embodiments.

FIG. 9 illustrates an example system 900 that supports one or more of the example embodiments described and/or depicted herein. The system 900 comprises a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples include, but are not limited to, microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
   a processor that, when executing instructions stored in a memory, is configured to:
   iteratively train an artificial intelligence (AI) model comprising a neural network by executing the neural network on actual events of historical shipments and predicted events of the historical shipments to generate a trained AI model;
   query, via an application programming interface (API), a blockchain ledger for attributes of a shipment by a carrier from an origin location to a destination location;
   predict, via the trained AI model, one or more future milestone events that will occur during the shipment based on the attributes of the shipment retrieved from querying the blockchain ledger;
   identify that the shipment requires processing;
   in response to the identification, call a smart contract to execute invoice generation, wherein the processor is further configured to:
   receive the one or more future milestone events from the trained AI model;
   predict, via the trained AI model, a value of charges based on the one or more future milestone events by a first logic of the smart contract;
   determine accuracy of the prediction of the value of the charges by a second logic of the smart contract;
   in response to the determination of the accuracy of the prediction of the value of the charges, generate, via the smart contract, a plurality of accelerated e-invoices during the shipment, where the plurality of accelerated e-invoices are based on and correspond to one or more milestone events that have already occurred and the predicted one or more future milestone events;
   store the plurality of accelerated e-invoices on the blockchain ledger;
   execute a plurality of payments corresponding to the plurality of accelerated e-invoices before the shipment reaches the destination; and
   display information associated with the shipment by a user interface.

2. The apparatus of claim 1, wherein the processor is configured to:
   query the blockchain ledger, which includes an identifier of a freight included in the shipment, and receive one or more tracked events of the freight extracted from the blockchain ledger.

3. The apparatus of claim 1, wherein the processor is further configured to: map the shipment to a predefined shipping lane from among a plurality of shipping lanes based on the origin location and the destination location.

4. The apparatus of claim 3, wherein the processor is further configured to: select the AI model from among a plurality of AI models based on the mapped predefined shipping lane from among the plurality of shipping lanes.

5. The apparatus of claim 1, wherein the processor is configured to:
   read, via the smart contract, attributes of a service contract stored on the blockchain ledger; and
   generate the plurality of accelerated e-invoices based on the attributes of the service contract, and the one or more milestone events that have already occurred, and the one or more future milestone events predicted by the trained AI model.

6. The apparatus of claim 1, wherein the processor is further configured to: receive progress updates on the shipment;
   predict or update, via the trained AI model, an earlier prediction for one or more future milestone events based on the progress updates to the shipment; and
   modify the plurality of accelerated e-invoices based on the one or more already happened milestone events and the predicted one or more future milestone events.

7. The apparatus of claim 1, wherein the processor is further configured to:
execute, via the blockchain platform, a payment that transfers fees to the carrier before the shipment reaches the destination location.

8. The apparatus of claim 7, wherein the processor is further configured to: execute a payment of a final e-invoice after the shipment reaches the destination location.

9. A method comprising:
iteratively training an artificial intelligence (AI) model comprising a neural network by executing the neural network on actual events of historical shipments and predicted events of the historical shipments to generate a trained AI model;
querying, via an application programming interface (API), a blockchain ledger for attributes of a shipment by a carrier from an origin location to a destination location;
predicting, via the trained AI model, one or more future milestone events that will occur during the shipment based on the attributes of the shipment retrieved from querying the blockchain ledger;
identifying that the shipment requires processing;
in response to the identifying, calling a smart contract to execute invoice generation, wherein the method further comprises:
receiving the one or more future milestone events from the trained AI model;
predicting, via the trained AI model, a value of charges based on the one or more future milestone events by a first logic of the smart contract;
determining accuracy of the prediction of the value of the charges by a second logic of the smart contract;
in response to the determination of the accuracy of the prediction of the value of the charges, generating, via the smart contract, a plurality of accelerated e-invoices during the shipment, where the plurality of accelerated e-invoices are based on and correspond to, one or more milestone events that have already occurred and the predicted one or more future milestone events;
storing the plurality of accelerated e-invoices on the blockchain ledger;
executing a plurality of payments corresponding to the plurality of accelerated e-invoices before the shipment reaches the destination; and
displaying information associated with the shipment by a user interface.

10. The method of claim 9, wherein the querying further comprises:
querying the blockchain ledger, which includes an identifier of a freight included in the shipment; and
receiving one or more tracked events of the freight extracted from the blockchain ledger.

11. The method of claim 9, wherein the method further comprises:
mapping the shipment to a predefined shipping lane from among a plurality of shipping lanes based on the origin location and the destination location.

12. The method of claim 11, wherein the method further comprises:
selecting the AI model from among a plurality of AI models based on the mapped predefined shipping lane from among the plurality of shipping lanes.

13. The method of claim 9, wherein the generating further comprises:
reading, via the smart contract, attributes of a service contract stored on the blockchain ledger; and
generating the plurality of accelerated e-invoices based on the attributes of the service contract, the one or more milestone events that have already occurred, and the one or more future milestone events predicted by the trained AI model.

14. The method of claim 9, wherein the method further comprises:
receiving progress updates on the shipment;
predicting or updating an earlier prediction for one or more additional future milestone events based on the progress updates to the shipment; and
modifying the plurality of accelerated e-invoices based on the one or more already that have already occurred and the predicted one or more future milestone events.

15. The method of claim 9, wherein the method further comprises:
executing, via the blockchain platform, a payment that transfers fees to the carrier before the shipment reaches the destination location.

16. The method of claim 15, wherein the executing of the payment further comprises:
executing a payment of a final e-invoice after the shipment reaches the destination location.

17. A non-transitory computer-readable medium comprising instructions that, when executed by a processor, cause the processor to perform:
iteratively training an artificial intelligence (AI) model comprising a neural network by executing the neural network on actual events of historical shipments and predicted events of the historical shipments to generate a trained AI model;
querying, via an application programming interface (API), a blockchain ledger for attributes of a shipment by a carrier from an origin location to a destination location;
predicting, via the trained AI model, one or more future milestone events that will occur during the shipment based on the attributes of the shipment retrieved from querying the blockchain ledger;
identifying that the shipment requires processing;
in response to the identifying, calling a smart contract to execute invoice generation, wherein the instructions further cause the processor to perform:
receiving the one or more future milestone events from the trained AI model;
predicting, via the trained AI model, a value of charges based on the one or more future milestone events by a first logic of the smart contract;
determining accuracy of the prediction of the value of the charges by a second logic of the smart contract;
in response to the determination of the accuracy of the prediction of the value of the charges, generating, via the smart contract, a plurality of accelerated e-invoices during the shipment, where the plurality of accelerated e-invoices are based on and correspond to, one or more milestone events that have already occurred and the predicted one or more future milestone events;
storing the plurality of accelerated e-invoices on the blockchain ledger;
executing a plurality of payments corresponding to the plurality of accelerated e-invoices before the shipment reaches the destination; and
displaying information associated with the shipment by a user interface.

18. The non-transitory computer-readable medium of claim 17, wherein the querying comprises:
  querying the blockchain ledger, which includes an identifier of a freight included in the shipment; and
  receiving one or more tracked events of the freight extracted from the blockchain ledger.

19. The non-transitory computer-readable medium of claim 17, wherein the instructions further cause the processor to perform:
  mapping the shipment to a predefined shipping lane from among a plurality of shipping lanes based on the origin location and the destination location.

20. The non-transitory computer-readable medium of claim 17, wherein the instructions further cause the processor to perform:
  selecting the AI model from among a plurality of AI models based on the mapped predefined shipping lane from among the plurality of shipping lanes.

* * * * *